(12) United States Patent
Wu

(10) Patent No.: US 12,507,228 B2
(45) Date of Patent: Dec. 23, 2025

(54) METHOD AND DEVICE IN NODES USED FOR WIRELESS COMMUNICATION

(71) Applicant: Lu Wu, Shanghai (CN)

(72) Inventor: Lu Wu, Shanghai (CN)

(73) Assignee: SHANGHAI TUILUO COMMUNICATION TECHNOLOGY PARTNERSHIP (LIMITED PARTNERSHIP), Shanghai (CN)

( * ) Notice: Subject to any disclaimer, the term of this patent is extended or adjusted under 35 U.S.C. 154(b) by 344 days.

(21) Appl. No.: 18/225,690

(22) Filed: Jul. 25, 2023

(65) Prior Publication Data

US 2023/0397181 A1    Dec. 7, 2023

Related U.S. Application Data

(63) Continuation of application No. PCT/CN2022/073962, filed on Jan. 26, 2022.

(30) Foreign Application Priority Data

Feb. 3, 2021 (CN) .......................... 202110146555.7
Dec. 8, 2021 (CN) .......................... 202111489779.4

(51) Int. Cl.
  *H04W 4/00*      (2018.01)
  *H04L 5/00*      (2006.01)
  *H04W 72/044*    (2023.01)

(52) U.S. Cl.
  CPC ......... *H04W 72/046* (2013.01); *H04L 5/0048* (2013.01)

(58) Field of Classification Search
  CPC .. H04W 72/046; H04W 72/23; H04L 5/0048; H04L 5/0023; H04L 5/00; H04L 5/0053
  See application file for complete search history.

(56) References Cited

U.S. PATENT DOCUMENTS

2021/0266947 A1\*  8/2021  Yang ................... H04L 5/0053
2022/0386144 A1\* 12/2022  Yang ................... H04L 5/0023
(Continued)

FOREIGN PATENT DOCUMENTS

CA   3135038 A1 \* 10/2020 ........... H04L 5/0053
CN   109309553 A    2/2019
(Continued)

OTHER PUBLICATIONS

ISR received in application No. PCT/CN2022/073962 dated Apr. 18, 2022.

*Primary Examiner* — Thai Dinh Hoang

(57) ABSTRACT

A method and a device in a node for wireless communications. A first node receives a first signaling, the first signaling being used to determine a first time; and receives a first reference signal after the first time. The first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set.

20 Claims, 4 Drawing Sheets

(56) References Cited

U.S. PATENT DOCUMENTS

| | | | |
|---|---|---|---|
| 2023/0058303 A1* | 2/2023 | Matsumura | H04L 5/0053 |
| 2023/0180023 A1* | 6/2023 | Yang | H04L 5/0051 |
| | | | 370/329 |
| 2025/0167902 A1* | 5/2025 | Li | H04L 5/0053 |

FOREIGN PATENT DOCUMENTS

| | | |
|---|---|---|
| CN | 111034308 A | 4/2020 |
| CN | 112312416 A | 2/2021 |
| WO | 2020145676 A1 | 7/2020 |

* cited by examiner

When target channel is downlink physical layer channel → First reference signal and target reference signal are spatially unrelated

FIG. 13

When target channel is downlink physical layer channel and first reference signal belongs to second reference signal set → the first reference signal and the target reference signal are spatially related When target channel is downlink physical layer channel and first reference signal does not belong to second reference signal set → the first reference signal and the target reference signal are spatially unrelated

FIG. 14

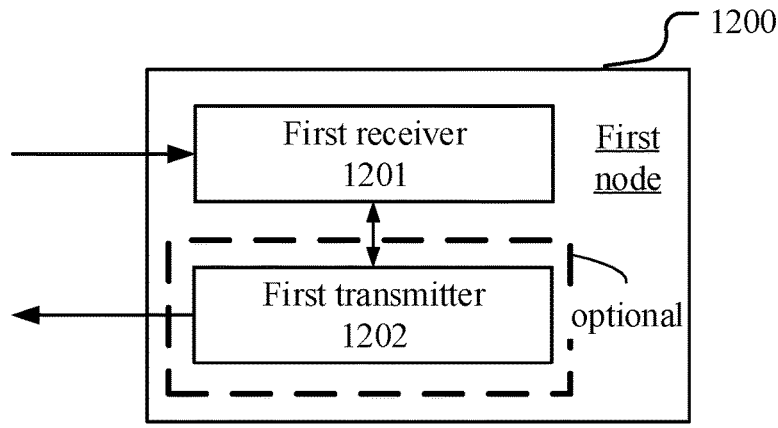

FIG. 15

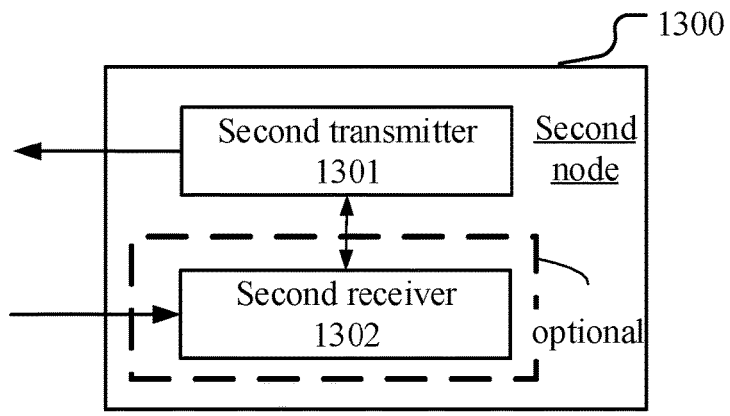

FIG. 16

METHOD AND DEVICE IN NODES USED FOR WIRELESS COMMUNICATION

CROSS REFERENCE TO RELATED APPLICATIONS

This application is the continuation of the international patent application No. PCT/CN2022/073962, filed on Jan. 26, 2022, and claims the priority benefit of Chinese Patent Application No. 202111489779.4, filed on Dec. 8, 2021, and claims the priority benefit of Chinese Patent Application No. 202110146555.7, filed on Feb. 3, 2021, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

In New Radio (NR) Release 15 (R15) and R16, different beam management/indication mechanisms are respectively adopted for a control channel and a data channel, as well as for the uplink and the downlink. However, in many cases the control channel and the data channel can use the same beam, and since there exists channel reciprocity between an uplink channel and a downlink channel under many application scenarios, the same beam is also applicable. At the 3GPP Radio Access Network (RAN) 1 #103e conference, the technique of using physical layer signaling to update beams for the control channel and the data channel has been approved.

SUMMARY

The applicant finds through researches that how a physical-layer signaling used for controlling beams for both a control channel and a data channel influences the consistency between a transmitting end and a receiving end is an issue for consideration.

To address the above problem, the present application provides a solution. It should be noted that although the statement above only took the example of cellular networks, the present application also applies to other scenarios like Vehicle-to-Everything (V2X), where similar technical effects can be achieved. Additionally, the adoption of a unified solution for various scenarios, including but not limited to cellular networks and V2X, contributes to the reduction of hardcore complexity and costs. In the case of no conflict, the embodiments of any node and the characteristics in the embodiments may be applied to any other node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:
  receiving a first signaling, the first signaling being used to determine a first time; and
  receiving a first reference signal after the first time;
  herein, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, a problem to be solved in the present application includes: how to determine whether a beam for a reference signal is to be updated according to a beam update signaling.

In one embodiment, a problem to be solved in the present application includes: how to determine whether a beam for a downlink reference signal is to be updated according to a beam update signaling.

In one embodiment, a problem to be solved in the present application includes: for a non-codebook-based uplink transmission, part or all of SRSs in an SRS set are used to determine a precoder of a PUSCH, since the SRS set is associated with a CSI-RS, a measurement of the CSI-RS is used to determine a precoder of the SRS set; when an uplink beam is updated, a beam for the SRS set needs to be updated, if the beam for the SRS set and the beam for the CSI-RS are not identical, the communication quality of the PUSCH will be affected.

In one embodiment, the essence of the above method lies in that a first signaling is used to indicate uplink or downlink beam(s) being updated after a first time, where a target reference signal represents an updated beam, and a first reference signal comprises a CSI-RS; whether a beam for a first reference signal is to be updated is determined according to whether an uplink or a downlink beam is updated; when it is an uplink beam that is updated and a first reference signal belongs to a first reference signal set, a beam for the first reference signal is updated with a new beam.

In one embodiment, the essence of the above method lies in that part of downlink reference signals are updated along with the update of an uplink beam.

In one embodiment, the essence of the above method lies in that for a non-Codebook based uplink transmission, partial or all SRSs in one SRS set are used to determine a precoder of a PUSCH, where a first reference signal is a CSI-RS used to determine a precoder of the SRS set; when an uplink beam is updated, a beam for the SRS set shall be updated, and a beam for the CSI-RS shall also be updated accordingly.

In one embodiment, an advantage of the above method includes: ensuring the consistency of the transmitting end and the receiving end with beams being updated.

In one embodiment, an advantage of the above method includes: ensuring the communication quality with beams being updated.

According to one aspect of the present application, characterized in that when the target channel is an uplink physical layer channel and the first reference signal does not belong to the first reference signal set, the first reference signal and the target reference signal are spatially unrelated.

According to one aspect of the present application, characterized in that when the target channel is a downlink physical layer channel, the first reference signal and the target reference signal are spatially unrelated.

According to one aspect of the present application, characterized in that when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

In one embodiment, the essence of the above method lies in that part of downlink reference signals will be updated along with the update of downlink beams, while the other ones will be updated with the update of uplink beams.

According to one aspect of the present application, characterized in comprising:

transmitting a third reference signal set;

herein, the target channel is an uplink physical layer channel, and at least one reference signal in the third reference signal set is used to determine a precoder of a signal transmitted on the target channel; the third reference signal set is associated with the first reference signal set.

According to one aspect of the present application, characterized in that before the first time, the spatial relation of the transmission on the target channel is unrelated to the target reference signal.

According to one aspect of the present application, characterized in comprising:

transmitting a first signal;

where the first signaling is used to indicate time-frequency resources occupied by the first signal; the transmission of the first signal is used to indicate that after the first time, the target reference signal is used to determine the spatial relation of the transmission on the target channel.

The present application provides a method in a second node for wireless communications, comprising:

transmitting a first signaling, the first signaling being used to determine a first time; and transmitting a first reference signal after the first time;

herein, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

According to one aspect of the present application, characterized in that when the target channel is an uplink physical layer channel and the first reference signal does not belong to the first reference signal set, the first reference signal and the target reference signal are spatially unrelated.

According to one aspect of the present application, characterized in that when the target channel is a downlink physical layer channel, the first reference signal and the target reference signal are spatially unrelated.

According to one aspect of the present application, characterized in that when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

According to one aspect of the present application, characterized in comprising:

receiving a third reference signal set;

herein, the target channel is an uplink physical layer channel, and at least one reference signal in the third reference signal set is used to determine a precoder of a signal transmitted on the target channel; the third reference signal set is associated with the first reference signal set.

According to one aspect of the present application, characterized in that before the first time, the spatial relation of the transmission on the target channel is unrelated to the target reference signal.

According to one aspect of the present application, characterized in comprising:

receiving a first signal;

where the first signaling is used to indicate time-frequency resources occupied by the first signal; the transmission of the first signal is used to indicate that after the first time, the target reference signal is used to determine the spatial relation of the transmission on the target channel.

The present application provides a first node for wireless communications, comprising:

a first receiver, receiving a first signaling, the first signaling being used to determine a first time; and receiving a first reference signal after the first time;

herein, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

The present application provides a second node for wireless communications, comprising:

a second transmitter, transmitting a first signaling, the first signaling being used to determine a first time; and transmitting a first reference signal after the first time; herein, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, compared with the prior art, the present application is advantageous in the following aspects:
ensuring the consistency of the transmitting end and the receiving end with beams being updated;
ensuring the communication quality with beams being updated.

BRIEF DESCRIPTION OF THE DRAWINGS

Other features, objects and advantages of the present application will become more apparent from the detailed description of non-restrictive embodiments taken in conjunction with the following drawings:

FIG. 13 illustrates a schematic diagram of a relation between whether a first reference signal and a target reference signal are spatially related and a target channel according to another embodiment of the present application.

FIG. 14 illustrates a schematic diagram of a relation between whether a first reference signal and a target reference signal are spatially related and a target channel according to another embodiment of the present application.

FIG. 15 illustrates a structure block diagram of a processing device in a first node according to one embodiment of the present application.

FIG. 16 illustrates a structure block diagram of a processing device used in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
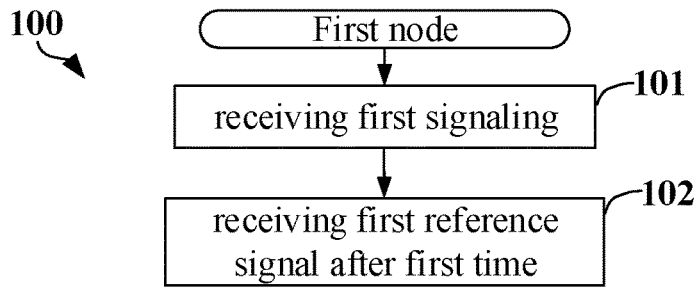
FIG. 1 illustrates a flowchart of a first signaling and a first reference signal according to one embodiment of the present application.

Embodiment 1 illustrates a flowchart of transmission of a first signaling and a first reference signal according to one embodiment of the present application, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present application receives a first signaling in step 101; and receives a first reference signal after the first time in step 102; herein, the first signaling is used to determine a first time; the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, the first signaling is a higher-layer signaling.

In one embodiment, the first signaling is an RRC signaling.

In one embodiment, the first signaling is a MAC CE signaling.

In one embodiment, the first signaling is a physical layer signaling.

In one embodiment, the first signaling is a piece of Downlink Control Information (DCI).

In one embodiment, the first signaling comprises DownLink Grant DCI.

In one embodiment, the first signaling comprises UpLink Grant DCI.

In one embodiment, the target reference signal comprises a downlink reference signal.

In one embodiment, the target reference signal comprises an uplink reference signal.

In one embodiment, the target reference signal comprises a downlink reference signal or an uplink reference signal.

In one embodiment, the uplink reference signal comprises a Sounding Reference Signal (SRS).

In one embodiment, the uplink reference signal comprises a DeModulation Reference Signal (DMRS).

In one embodiment, the downlink reference signal comprises a CSI-RS.

In one embodiment, the downlink reference signal comprises an NZP CSI-RS.

In one embodiment, the downlink reference signal comprises an SSB.

In one embodiment, the downlink reference signal comprises a CSI-RS or an SSB.

In one embodiment, the target reference signal comprises a Channel State Information-Reference Signal (CSI-RS).

In one embodiment, the target reference signal comprises a CSI-RS resource.

In one embodiment, the target reference signal comprises a Non-Zero Power (NZP) CSI-RS.

In one embodiment, the target reference signal comprises an NZP CSI-RS resource.

In one embodiment, the target reference signal comprises a Synchronisation Signal/physical broadcast channel Block (SSB).

In one embodiment, the target reference signal comprises an SSB resource.

In one embodiment, the target reference signal comprises a Sounding Reference Signal (SRS).

In one embodiment, the target reference signal comprises an SRS resource.

In one embodiment, the target reference signal is a CSI-RS or an SSB.

In one embodiment, the target reference signal is one of a CSI-RS, an SSB or an SRS.

In one embodiment, an index of the target reference signal includes an NZP-CSI-RS-ResourceId.

In one embodiment, an index of the target reference signal includes an NZP-CSI-RS-ResourceSetId.

In one embodiment, an index of the target reference signal includes an SSB-Index.

In one embodiment, an index of the target reference signal includes an SRS-ResourceSetId.

In one embodiment, an index of the target reference signal includes an SRS-ResourceId.

In one embodiment, the reference signal comprises a reference signal resource.

In one embodiment, the reference signal comprises a reference signal port.

In one embodiment, modulation symbols comprised in the reference signal are known to the first node.

In one embodiment, the first signaling explicitly indicates a target reference signal.

In one embodiment, the first signaling implicitly indicates a target reference signal.

In one embodiment, the first signaling indicates the target reference signal.

In one embodiment, the first signaling indicates an index of the target reference signal.

In one embodiment, the first signaling indicates a first Transmission Configuration Indicator (TCI) state, the first TCI state indicating the target reference signal.

In one embodiment, the first signaling indicates a first TCI state in N TCI states, the first TCI state indicating the target reference signal, where N is a positive integer greater than 1.

In one embodiment, the first signaling indicates a TCI codepoint corresponding to the first TCI state.

In one embodiment, the first signaling comprises a first field, the first field comprising at least one bit; the first field in the first signaling indicates the target reference signal.

In one embodiment, the first signaling comprises a first field, the first field comprising at least one bit; the first node determines that after the first time, the target reference signal is used to determine the spatial relation of the transmission on the target channel, according to a value of the first field in the first signaling.

In one embodiment, the first signaling comprises a first field, the first field comprising at least one bit; the first node determines that after the first time, the target reference signal is used to determine the spatial relation of the transmission on the target channel, according to that a value of the first field in the first signaling equals a first value; the first value is a non-negative integer.

In one embodiment, the first field only comprises 1 bit.

In one embodiment, the first field comprises more than 1 bit.

In one embodiment, the first value is equal to 1.

In one embodiment, the first value is equal to 0.

In one embodiment, the target reference signal is indicated by a higher layer signaling.

In one embodiment, the higher layer signaling includes an RRC signaling.

In one embodiment, the higher layer signaling includes a MAC CE signaling.

In one embodiment, a time for transmitting a higher layer signaling indicating the target reference signal is earlier than a time for transmitting the first signaling.

In one embodiment, the first field in the first signaling indicates the first TCI state.

In one embodiment, a value of the first field in the first signaling is equal to a TCI codepoint corresponding to the first TCI state.

In one embodiment, the first field comprises 3 bits.

In one embodiment, the first field comprises a Transmission configuration indication field.

In one embodiment, the first field comprises an SRS resource indicator field.

In one embodiment, the definition of the Transmission configuration indication field can be found in 3 GPP TS38.212, section 7.3.

In one embodiment, the definition of the SRS resource indicator field can be found in 3GPP TS38.212, section 7.3.

In one embodiment, the first reference signal is a downlink reference signal.

In one embodiment, the first reference signal includes a downlink reference signal.

In one embodiment, the first reference signal comprises a CSI-RS resource.

In one embodiment, the first reference signal comprises a CSI-RS.

In one embodiment, the target channel is an uplink physical layer channel or a downlink physical layer channel.

In one embodiment, the uplink physical layer channel includes an uplink physical layer data channel.

In one embodiment, the uplink physical layer channel includes an uplink physical layer control channel.

In one embodiment, the uplink physical layer channel includes an uplink physical layer data channel and an uplink physical layer control channel.

In one embodiment, the uplink physical layer data channel is a Physical Uplink Shared CHannel (PUSCH).

In one embodiment, the uplink physical layer data channel is a short PUSCH (sPUSCH).

In one embodiment, the uplink physical layer data channel is a Narrow Band PUSCH (NPUSCH).

In one embodiment, the uplink physical-layer control channel is a Physical Uplink Control Channel (PUCCH).

In one embodiment, the uplink physical-layer control channel is a short PUCCH (sPUCCH).

In one embodiment, the uplink physical-layer control channel is a Narrow Band PUCCH (NB-PUCCH).

In one embodiment, the downlink physical layer channel includes a downlink physical layer data channel.

In one embodiment, the downlink physical layer channel includes a downlink physical layer control channel.

In one embodiment, the downlink physical layer channel includes a downlink physical layer data channel and a downlink physical layer control channel.

In one embodiment, the downlink physical layer data channel is a Physical Downlink Shared Channel (PDSCH).

In one embodiment, the downlink physical layer data channel is a short PDSCH (sPDSCH).

In one embodiment, the downlink physical layer data channel is a Narrow Band PDSCH (NPDSCH).

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a Narrow Band PDCCH (NB-PDCCH).

In one embodiment, when the action of "determining whether the first reference signal and the target reference signal are spatially related" turns out to be yes, the first reference signal and the target reference signal are spatially related; when the action of "determining whether the first reference signal and the target reference signal are spatially related" turns out to be no, the first reference signal and the target reference signal are spatially unrelated.

In one embodiment, the phrase that "the first reference signal and the target reference signal are spatially related" means that: a TCI state of the first reference signal is identical to a TCI state of the target reference signal.

In one embodiment, the phrase that "the first reference signal and the target reference signal are spatially related" means that: a QCL parameter of the first reference signal is identical to a QCL parameter of the first reference signal.

In one embodiment, the phrase that "the first reference signal and the target reference signal are spatially related" means that: both the first reference signal and the target reference signal are downlink reference signals, where a QCL parameter of the first reference signal is identical to a QCL parameter of the first reference signal.

In one embodiment, the phrase that "the first reference signal and the target reference signal are spatially related" means that: a spatial domain filter for the first reference signal is identical to a spatial domain filter for the target reference signal.

In one embodiment, the phrase that "the first reference signal and the target reference signal are spatially related" means that: both the first reference signal and the target reference signal are downlink reference signals, where a spatial domain reception filter for the first reference signal is identical to a spatial domain reception filter for the target reference signal.

In one embodiment, the phrase that "the first reference signal and the target reference signal are spatially related" means that: the first reference signal is a downlink reference signal, while the target reference signal is an uplink reference signal, where a spatial domain reception filter for the first reference signal is identical to a spatial domain transmission filter for the target reference signal.

In one embodiment, the phrase that "the first reference signal and the target reference signal are spatially related" means that: a spatial parameter of the first reference signal is identical to a spatial parameter of the first reference signal.

In one embodiment, the phrase that "the first reference signal and the target reference signal are spatially related" means that: both the first reference signal and the target reference signal are downlink reference signals, where a spatial Rx parameter of the first reference signal is identical to a spatial Rx parameter of the target reference signal.

In one embodiment, the phrase that "the first reference signal and the target reference signal are spatially related" means that: the first reference signal is a downlink reference signal, while the target reference signal is an uplink reference signal, where a spatial Rx parameter of the first reference signal is identical to a spatial Tx parameter of the target reference signal.

In one embodiment, the phrase that "the first reference signal and the target reference signal are spatially unrelated" means that: a TCI state of the first reference signal is different from a TCI state of the target reference signal.

In one embodiment, the phrase that "the first reference signal and the target reference signal are spatially unrelated" means that: a QCL parameter of the first reference signal is different from a QCL parameter of the first reference signal.

In one embodiment, the phrase that "the first reference signal and the target reference signal are spatially unrelated" means that: both the first reference signal and the target reference signal are downlink reference signals, where a QCL parameter of the first reference signal is different from a QCL parameter of the first reference signal.

In one embodiment, the phrase that "the first reference signal and the target reference signal are spatially unrelated" means that: a spatial domain filter for the first reference signal is different from a spatial domain filter for the target reference signal.

In one embodiment, the phrase that "the first reference signal and the target reference signal are spatially unrelated" means that: both the first reference signal and the target reference signal are downlink reference signals, where a spatial domain reception filter for the first reference signal is different from a spatial domain reception filter for the target reference signal.

In one embodiment, the phrase that "the first reference signal and the target reference signal are spatially unrelated" means that: the first reference signal is a downlink reference signal, while the target reference signal is an uplink reference signal, where a spatial domain reception filter for the first reference signal is different from a spatial domain transmission filter for the target reference signal.

In one embodiment, the phrase that "the first reference signal and the target reference signal are spatially unrelated" means that: a spatial parameter of the first reference signal is different from a spatial parameter of the first reference signal.

In one embodiment, the phrase that "the first reference signal and the target reference signal are spatially unrelated"

means that: both the first reference signal and the target reference signal are downlink reference signals, where a spatial Rx parameter of the first reference signal is different from a spatial Rx parameter of the target reference signal.

In one embodiment, the phrase that "the first reference signal and the target reference signal are spatially unrelated" means that: the first reference signal is a downlink reference signal, while the target reference signal is an uplink reference signal, where a spatial Rx parameter of the first reference signal is different from a spatial Tx parameter of the target reference signal.

Embodiment 2

Figure 2:
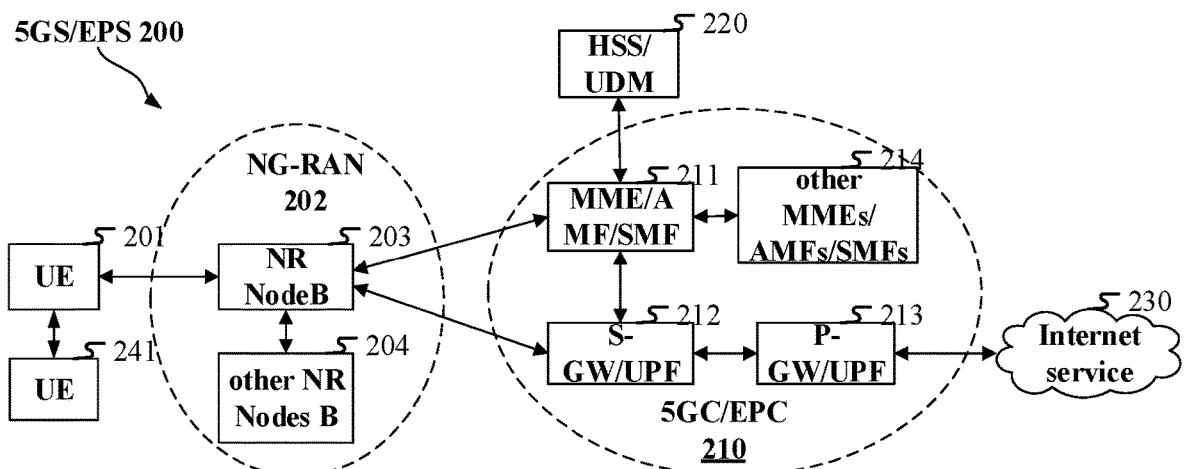
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The 5G NR or LTE network 200 can be called a 5G System/Evolved Packet System (5GS/EPS)200 or other appropriate terms. The 5GS/EPS 200 may comprise one or more UEs 201, a UE 241 in sidelink communication with the UE(s) 201, an NG-RAN 202, a 5G CoreNetwork/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises a New Radio (NR) node B (gNB) 203 and other gNBs 204. The gNB 203 provides UE 201—oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the second node in the present application includes the UE 241.

In one embodiment, the second node in the present application includes the gNB 203.

Embodiment 3

Figure 3:
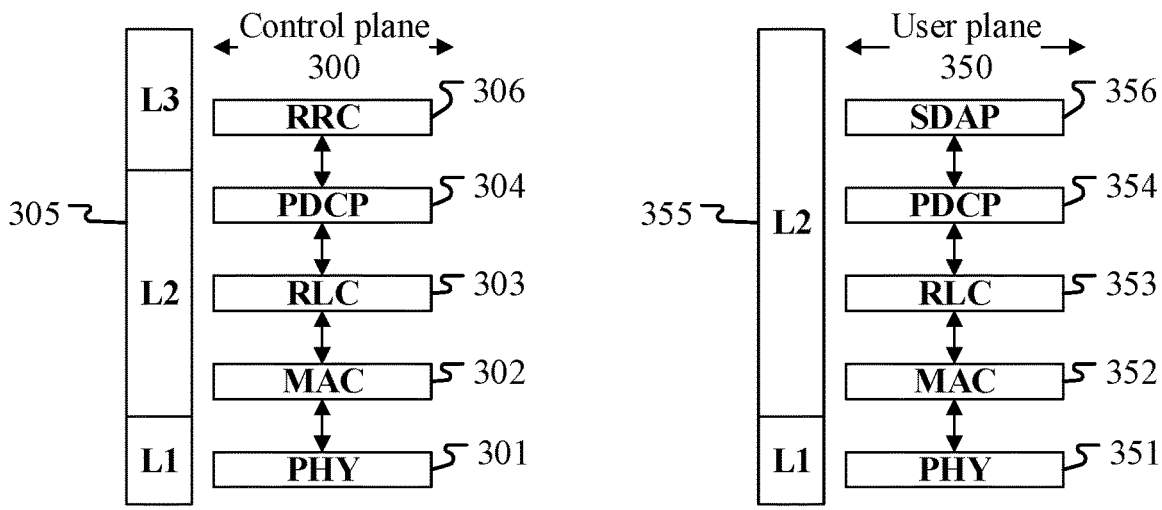
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the PHY 301, or the PHY 351.

In one embodiment, the first signaling is generated by the Radio Resource Control (RRC) sublayer 306.

In one embodiment, the first signaling is generated by the MAC sublayer 302, or the MAC sublayer 352.

In one embodiment, the first signal is generated by the PHY 301, or the PHY 351.

In one embodiment, the first reference signal is generated by the PHY 301, or the PHY 351.

In one embodiment, the third reference signal set is generated by the PHY 301, or the PHY 351.

Embodiment 4

Figure 4:
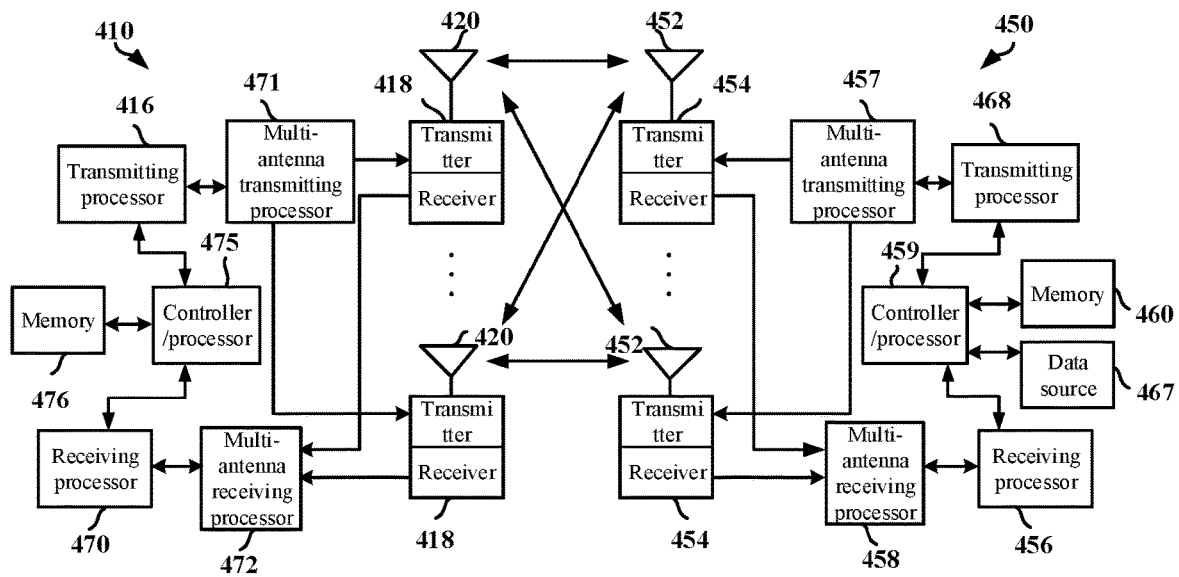
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any parallel stream targeting the second communication device 450. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: receives a first signaling, the first signaling being used to determine a first time; and receives a first reference signal after the first time; herein, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, the second communication device 450 comprises a memory that stores a computer readable instruction program, the computer readable instruction program generates actions when executed by at least one processor, which include: receiving a first signaling, the first signaling being used to determine a first time; and receiving a first reference signal after the first time; herein, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits a first signaling, the first signaling being used to determine a first time; and transmits a first reference signal after the first time; herein, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, the first communication device 410 comprises a memory that stores a computer readable instruction program, the computer readable instruction program generates actions when executed by at least one processor, which include: transmitting a first signaling, the first signaling being used to determine a first time; and transmitting a first reference signal after the first time; herein, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, the first node in the present application comprises the second communication device 450.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling in the present application; at least one of the antenna 420, the transmitter 418, the transmitting processor 416, the multi-antenna transmitting processor 471, the controller/processor 475 or the memory 476 is used to transmit the first signaling in the present application.

In one embodiment, at least one of the antenna 452, the receiver 454, the receiving processor 456, the multi-antenna receiving processor 458, the controller/processor 459, the memory 460 or the data source 467 is used to receive the first reference signal in the present application; at least one of the antenna 420, the transmitter 418, the transmitting processor 416, the multi-antenna transmitting processor 471, the controller/processor 475 or the memory 476 is used to transmit the first reference signal in the present application.

In one embodiment, at least one of the antenna 452, the transmitter 454, the transmitting processor 468, the multi-antenna transmitting processor 457, the controller/processor 459 or the memory 460 is used to transmit the first signal in the present application; at least one of the antenna 420, the receiver 418, the receiving processor 470, the multi-antenna receiving processor 472, the controller/processor 475 or the memory 476 is used to receive the first signal in the present application.

In one embodiment, at least one of the antenna 452, the transmitter 454, the transmitting processor 468, the multi-antenna transmitting processor 457, the controller/processor 459 or the memory 460 is used to transmit the third reference signal set in the present application; at least one of the antenna 420, the receiver 418, the receiving processor 470, the multi-antenna receiving processor 472, the controller/processor 475 or the memory 476 is used to receive the third reference signal set in the present application.

Embodiment 5

Figure 5:
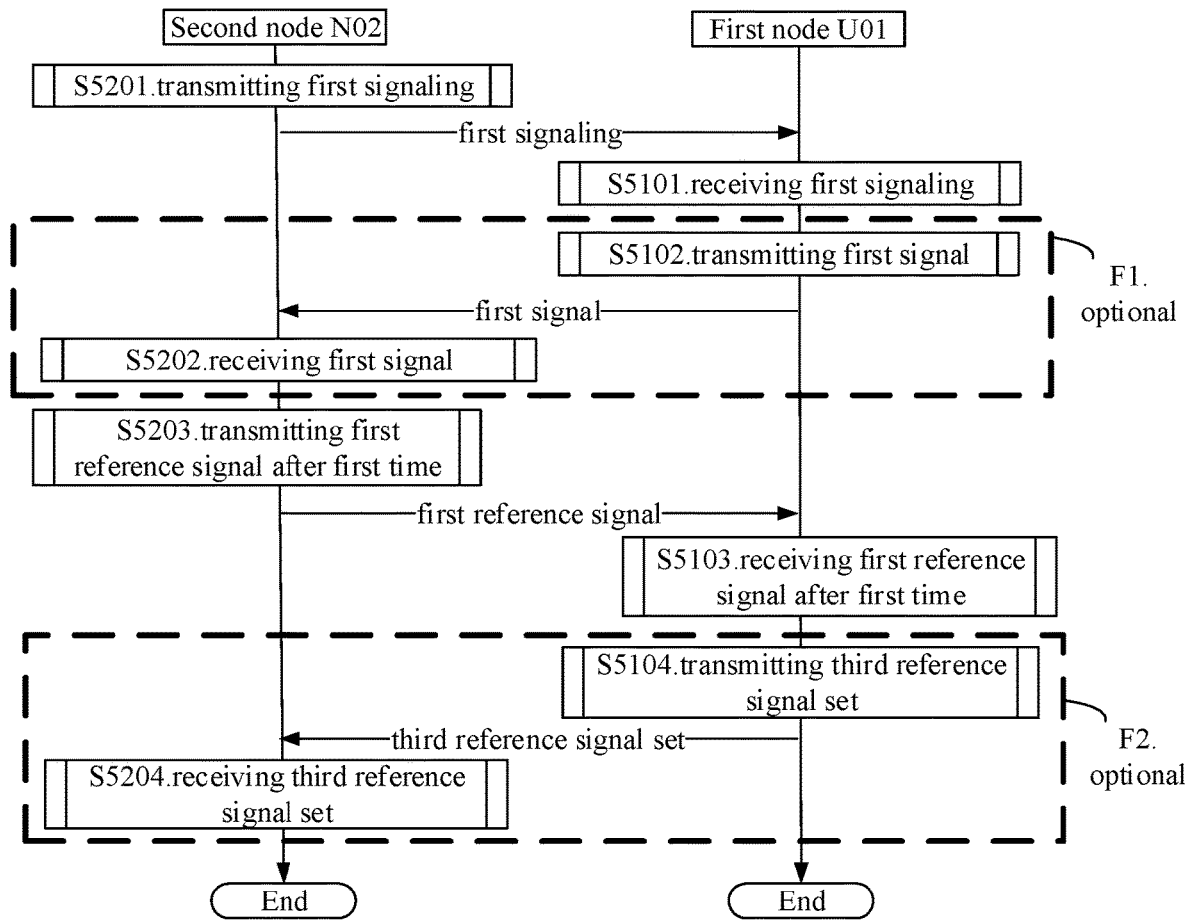
FIG. 5 illustrates a flowchart of transmission according to one embodiment of the present application.

Embodiment 5 illustrates a flowchart of wireless transmission according to one embodiment of the present application, as shown in FIG. 5. In FIG. 5, a first node U01 and a second node N02 are respectively two communication nodes that transmit via an air interface. In FIG. 5, the boxes F1 and F2 are optional.

The first node U01 receives a first signaling in step S5101; and transmits a first signal in step S5102; and receives a first reference signal after the first time in step S5103; and transmits a third reference signal set in step S5104;

The second node N02 transmits a first signaling in step S5201; and receives a first signal in step S5202; and transmits a first reference signal after the first time in step S5203; and receives a third reference signal set in step S5204.

In Embodiment 5, the first signaling is used to determine a first time; the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used by the first node U01 to determine whether the first reference signal and the target reference signal are spatially related; when the target channel is an uplink physical layer channel and the first reference signal belongs to a first reference signal set, the first reference signal and the target reference signal are spatially related. the target channel is an uplink physical layer channel, and at least one reference signal in the third reference signal set is used by the first node U01 to determine a precoder of a signal transmitted on the target channel; the third reference signal set is associated with the first reference signal set. The first signaling is used to indicate time-frequency resources occupied by the first signal; the transmission of the first signal is used to indicate that after the first time, the target reference signal is used to determine the spatial relation of the transmission on the target channel.

In one embodiment, the first signaling is used by the first node U01 to determine a first time.

In one embodiment, the first signaling is used by the second node N02 to determine a first time.

In one embodiment, the target reference signal is used by the first node U01 to determine a spatial relation of a transmission on a target channel.

In one embodiment, the target reference signal is used by the second node N02 to determine a spatial relation of a transmission on a target channel.

In one embodiment, the method in the first node comprises:
  receiving a first information block set;
  herein, the first information block set is used to indicate the first reference signal set.

In one embodiment, the first receiver receives a first information block set; herein, the first information block set is used to indicate the first reference signal set.

In one embodiment, the method in the second node comprises:
  transmitting a first information block set;
  herein, the first information block set is used to indicate the first reference signal set.

In one embodiment, the second transmitter transmits a first information block set; herein, the first information block set is used to indicate the first reference signal set.

In one embodiment, the first information block set explicitly indicates the first reference signal set.

In one embodiment, the first information block set implicitly indicates the first reference signal set.

In one embodiment, the first information block set is borne by a higher layer signaling.

In one embodiment, the first information block set is borne by an RRC signaling.

In one embodiment, the first information block set is borne by a MAC CE signaling.

In one embodiment, the first information block set comprises multiple Information Elements (IEs) in an RRC signaling.

In one embodiment, the first information block set comprises one IE in an RRC signaling.

In one embodiment, the first information block set comprises partial fields in one IE in an RRC signaling.

In one embodiment, the first information block set comprises an IE SRS-Config.

In one embodiment, the first information block set comprises partial fields in an IE SRS-Config.

In one embodiment, the first information block set comprises a parameter srs-ResourceSetToAddModList.

In one embodiment, the first information block set comprises a field SRS-ResourceSet in an IE SRS-Config.

In one embodiment, the first information block set comprises at least one information block, where any information block in the first information block set comprises an SRS-Resource Set.

In one embodiment, the first information block set comprises a field SRS-ResourceSet of which a value of a usage field is nonCodebook.

In one embodiment, the first information block set comprises a field SRS-ResourceSet of which a value of a usage field is codebook.

In one embodiment, the first information block set comprises an SRS-Resource field.

In one embodiment, the first information block set comprises at least one information block, where any information block in the first information block set comprises an SRS-Resource.

In one embodiment, the first information block set indicates configuration information of each reference signal in the first reference signal set.

In one embodiment, configuration information of any reference signal in the first reference signal set comprises at least one of a number of ports, a time-domain behavior, time-domain resources being occupied, frequency-domain resources being occupied, a frequency-hopping bandwidth, a Cyclic shift, a Transmission comb value, a Transmission comb offset, an associated CSI-RS or a spatial relation.

In one subembodiment, the time-domain resources being occupied comprises a slot-level period and a slot-level offset, a number of symbols, and a starting symbol in a slot.

In one subembodiment, the time-domain behavior is Aperiodic, or semi-persistent, or periodic.

In one embodiment, configuration information of any reference signal in the first reference signal set comprises at least one of time-domain resources being occupied, frequency-domain resources being occupied, an associated CSI-RS or a spatial relation.

In one subembodiment, the time-domain resources being occupied comprises a slot-level period and a slot-level offset, a number of symbols, and a starting symbol in a slot.

In one embodiment, the first information block set indicates an index of each reference signal in the first reference signal set.

In one embodiment, the first information block set comprises J1 information blocks, and the first reference signal set comprises J1 reference signals, where J1 is a positive integer greater than 1; the J1 information blocks respectively indicate configuration information of the J1 reference signals.

In one embodiment, the first information block set comprises J1 information blocks, and the first reference signal set comprises J1 reference signals, where J1 is a positive integer greater than 1; the J1 information blocks respectively indicate indexes of the J1 reference signals.

In one embodiment, the method in the first node comprises:
receiving a second information block set; herein, the second information block set is used to indicate the second reference signal set.

In one embodiment, the first receiver receives a second information block set; herein, the second information block set is used to indicate the second reference signal set.

In one embodiment, the method in the second node comprises:
transmitting a second information block set;
herein, the second information block set is used to indicate the second reference signal set.

In one embodiment, the second transmitter transmits a second information block set; herein, the second information block set is used to indicate the second reference signal set.

In one embodiment, the second information block set and the first information block set respectively belong to different IEs.

In one embodiment, the second information block set and the first information block set belong to a same IE.

In one embodiment, the second information block set explicitly indicates the second reference signal set.

In one embodiment, the second information block set implicitly indicates the second reference signal set.

In one embodiment, the second information block set is borne by a higher layer signaling.

In one embodiment, the second information block set is borne by an RRC signaling.

In one embodiment, the second information block set is borne by a MAC CE signaling.

In one embodiment, the second information block set comprises multiple Information Elements (IEs) in an RRC signaling.

In one embodiment, the second information block set comprises one IE in an RRC signaling.

In one embodiment, the second information block set comprises partial fields in one IE in an RRC signaling.

In one embodiment, the second information block set comprises an IE TCI-State.

In one embodiment, the second information block set comprises an IE PDSCH-Config.

In one embodiment, the second information block set comprises a tci-StatesToAddModList.

In one embodiment, the second information block set comprises TCI States Activation/Deactivation for UE-specific PDSCH MAC CE.

In one embodiment, the second information block set comprises Enhanced TCI States Activation/Deactivation for UE-specific PDSCH MAC CE.

In one embodiment, the second information block set comprises at least one information block, where any information block in the second information block set comprises an IE TCI-State.

In one embodiment, the second information block set indicates configuration information of each reference signal in the second reference signal set.

In one embodiment, configuration information of any reference signal in the second reference signal set comprises at least one of a number of ports, a time-domain behavior, time-domain resources being occupied, frequency-domain resources being occupied, a frequency-hopping bandwidth, a Cyclic shift, a Transmission comb value, a Transmission comb offset, an associated CSI-RS or a spatial relation.

In one subembodiment, the time-domain resources being occupied comprises a slot-level period and a slot-level offset, a number of symbols, and a starting symbol in a slot.

In one subembodiment, the time-domain behavior is Aperiodic, or semi-persistent, or periodic.

In one embodiment, configuration information of any reference signal in the second reference signal set comprises at least one of time-domain resources being occupied, frequency-domain resources being occupied, an associated CSI-RS or a spatial relation.

In one subembodiment, the time-domain resources being occupied comprises a slot-level period and a slot-level offset, a number of symbols, and a starting symbol in a slot.

In one embodiment, the second information block set indicates an index of each reference signal in the second reference signal set.

In one embodiment, the second information block set comprises J2 information blocks, and the second reference signal set comprises J2 reference signals, where J2 is a positive integer greater than 1; the J2 information blocks respectively indicate configuration information of the J2 reference signals.

In one embodiment, the second information block set comprises J2 information blocks, and the second reference signal set comprises J2 reference signals, where J2 is a positive integer greater than 1; the J2 information blocks respectively indicate indexes of the J2 reference signals.

In one embodiment, the third reference signal set comprises at least one reference signal.

In one embodiment, the third reference signal set only comprises one reference signal.

In one embodiment, the third reference signal set comprises more than one reference signal.

In one embodiment, the third reference signal set comprises an uplink reference signal.

In one embodiment, the third reference signal set comprises an SRS.

In one embodiment, the third reference signal set only comprises an SRS.

In one embodiment, a third reference signal in the third reference signal set is used by the first node U01 to determine a codebook to which a precoder of a signal transmitted on the target channel belongs, where the third reference signal is a reference signal in the third reference signal set.

In one embodiment, for a Codebook based uplink transmission, at least one reference signal in the third reference signal set is used by the first node U01 to determine a codebook to which a precoder of a signal transmitted on the target channel belongs.

In one embodiment, a third reference signal in the third reference signal set is used by the first node U01 to determine a codebook to which a precoder of a signal transmitted on the target channel belongs; the codebook to which the precoder of the signal transmitted on the target channel belongs is an uplink codebook having a same number of antenna port(s) as the third reference signal.

In one embodiment, a precoder of a signal transmitted on the target channel is determined according to a first parameter set, the first parameter set comprising at least one reference signal in the third reference signal set.

In one embodiment, for a Codebook based uplink transmission, the first parameter set comprises an index, a TPMI and a transmission rank of a reference signal in the third reference signal set.

In one embodiment, for a Codebook based uplink transmission, the first parameter set comprises an index, a TPMI and a transmission rank of third reference signal.

In one embodiment, for a Non-Codebook based uplink transmission, the first parameter set only comprises (an) index(es) of at least one reference signal in the third reference signal set.

In one embodiment, the phrase that "the third reference signal set is associated with the first reference signal set" means that: a measurement of the first reference signal set is used for calculating a precoder of the third reference signal set.

In one embodiment, the phrase that "the third reference signal set is associated with the first reference signal set" means that: measurement(s) of at least one reference signal in the first reference signal set is(are) used for calculating (a) precoder(s) of at least one reference signal in the third reference signal set.

In one embodiment, the phrase that "the third reference signal set is associated with the first reference signal set" means that: the first reference signal set and the third reference signal set are spatially related.

In one embodiment, the phrase that "the third reference signal set is associated with the first reference signal set" means that: any reference signal in the first reference signal set is spatially related with at least one reference signal in the third reference signal set.

In one embodiment, the phrase that "a first given reference signal and a second given reference signal are spatially related" means that: a TCI state of the first given reference signal is identical to a TCI state of the second given reference signal.

In one embodiment, the phrase that "a first given reference signal and a second given reference signal are spatially related" means that: a QCL parameter of the first given reference signal is identical to a QCL parameter of the second given reference signal.

In one embodiment, the phrase that "a first given reference signal and a second given reference signal are spatially related" means that: the first given reference signal and the second given reference signal are both downlink reference signals, where a QCL parameter of the first given reference signal is identical to a QCL parameter of the second given reference signal.

In one embodiment, the phrase that "a first given reference signal and a second given reference signal are spatially related" means that: a spatial domain filter for the first given reference signal is identical to a spatial domain filter for the second given reference signal.

In one embodiment, the phrase that "a first given reference signal and a second given reference signal are spatially related" means that: the first given reference signal and the second given reference signal are both downlink reference signals, where a spatial domain reception filter for the first given reference signal is identical to a spatial domain reception filter for the second given reference signal.

In one embodiment, the phrase that "a first given reference signal and a second given reference signal are spatially related" means that: the first given reference signal and the second given reference signal are both uplink reference signals, where a spatial domain transmission filter for the first given reference signal is identical to a spatial domain transmission filter for the second given reference signal.

In one embodiment, the phrase that "a first given reference signal and a second given reference signal are spatially related" means that: the first given reference signal is an uplink reference signal, and the second given reference signal is a downlink reference signals, where a spatial domain transmission filter for the first given reference signal is identical to a spatial domain reception filter for the second given reference signal.

In one embodiment, the phrase that "a first given reference signal and a second given reference signal are spatially related" means that: the first given reference signal is a downlink reference signal, and the second given reference signal is an uplink reference signals, where a spatial domain reception filter for the first given reference signal is identical to a spatial domain transmission filter for the second given reference signal.

In one embodiment, the phrase that "a first given reference signal and a second given reference signal are spatially related" means that: a spatial parameter of the first given reference signal is identical to a spatial parameter of the second given reference signal.

In one embodiment, the phrase that "a first given reference signal and a second given reference signal are spatially related" means that: the first given reference signal and the second given reference signal are both downlink reference signals, where a spatial Rx parameter of the first given reference signal is identical to a spatial Rx parameter of the second given reference signal.

In one embodiment, the phrase that "a first given reference signal and a second given reference signal are spatially related" means that: the first given reference signal and the second given reference signal are both uplink reference signals, where a spatial Tx parameter of the first given reference signal is identical to a spatial Tx parameter of the second given reference signal.

In one embodiment, the phrase that "a first given reference signal and a second given reference signal are spatially related" means that: the first given reference signal is a downlink reference signal, and the second given reference signal is an uplink reference signals, where a spatial Rx parameter of the first given reference signal is identical to a spatial Tx parameter of the second given reference signal.

In one embodiment, the phrase that "a first given reference signal and a second given reference signal are spatially related" means that: the first given reference signal is an uplink reference signal, and the second given reference signal is a downlink reference signals, where a spatial Tx parameter of the first given reference signal is identical to a spatial Rx parameter of the second given reference signal.

In one embodiment, the first given reference signal is the first reference signal set, while the second given reference signal is the third reference signal set.

In one embodiment, the first given reference signal is a reference signal in the first reference signal set, while the second given reference signal is a reference signal in the third reference signal set.

In one embodiment, the first signal comprises a baseband signal.

In one embodiment, the first signal comprises a radio signal.

In one embodiment, the first signal comprises a radio frequency signal.

In one embodiment, the first signal comprises UCI.

In one embodiment, the first signaling explicitly indicates time-frequency resources occupied by the first signal.

In one embodiment, the first signaling implicitly indicates time-frequency resources occupied by the first signal.

In one embodiment, the first signaling comprises a second field, and the second field in the first signaling is used to indicate time-frequency resources occupied by the first signal.

In one embodiment, the second field in the first signaling indicates an index of time-frequency resources occupied by the first signal in a third time-frequency resource set.

In one embodiment, the second field is a PUCCH resource indicator field, and the third time-frequency resource set is a PUCCH resource set.

In one embodiment, the specific definition of the PUCCH resource indicator field can be found in 3GPP TS38.212, section 7.3.1.

In one embodiment, the first signal comprises a Hybrid Automatic Repeat Request-Acknowledgement (HARQ-ACK).

In one embodiment, the first signal comprises a HARQ-ACK for the first signaling.

In one embodiment, the first signal comprises a HARQ-ACK for the second signal.

In one embodiment, the HARQ-ACK comprises an ACK.

In one embodiment, the HARQ-ACK comprises a Negative ACKnowledgement (NACK).

In one embodiment, the first signal comprises an ACK.

In one embodiment, the first signal is used to determine that the first signaling is correctly received.

In one embodiment, the first signal is used to indicate that the first signaling is correctly received.

In one embodiment, the first signal explicitly indicates that the first signaling is correctly received.

In one embodiment, the first signal implicitly indicates that the first signaling is correctly received.

In one embodiment, the first signal comprises a PUCCH transmission.

In one embodiment, the first signal comprises a PUSCH transmission.

In one embodiment, the first signal carries a second bit block, the second bit block comprising at least one bit.

In one embodiment, the second bit block comprises a TB.

In one embodiment, the second bit block comprises at least one TB.

In one embodiment, the second bit block comprises a CBG.

In one embodiment, the second bit block comprises at least one CBG.

In one embodiment, the first signaling comprises a third field and a fourth field, where the third field in the first signaling indicates time-domain resources occupied by the first signal, while the fourth field in the first signaling indicates frequency-domain resources occupied by the first signal.

In one embodiment, the third field is a timeDomainAllocation field, while the fourth field is a frequencyDomainAllocation field.

In one embodiment, the third field is a Time domain resource assignment field, while the fourth field is a Frequency domain resource assignment field.

In one embodiment, the first signaling indicates scheduling information of the first signal.

In one embodiment, scheduling information of the first signal comprises: at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), a transmission antenna port, an SRS resource indication, precoding information or a number of layers.

In one embodiment, the method in the first node comprises:
  receiving a second signal;
  herein, the first signaling is used to indicate scheduling information of the second signal; the first signal is used to indicate whether the second signal is correctly received.

In one embodiment, the scheduling information of the second signal comprises: at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), a transmission antenna port, or a corresponding Transmission Configuration Indicator (TCI) state.

In one embodiment, the configuration information of the DMRS comprises at least one of a Reference Signal (RS) sequence, a mapping mode, a DMRS type, time-domain resources being occupied, frequency-domain resources being occupied, code-domain resources being occupied, a cyclic shift, or an Orthogonal Cover Code (OCC).

In one embodiment, the second signal comprises a PDSCH transmission.

In one embodiment, the second signal carries a first bit block, the first bit block comprising at least one bit.

In one embodiment, the first bit block comprises one TB.

In one embodiment, the first bit block comprises at least one TB.

In one embodiment, the first bit block comprises one CBG.

In one embodiment, the first bit block comprises at least one CBG.

In one embodiment, the first signal indicates whether the second signal is correctly received.

In one embodiment, the first signal indicates that the second signal is correctly received.

In one embodiment, the first signaling carries a first bit block.

In one embodiment, the first bit block comprises DCI.

In one embodiment, the first signal indicates whether a first bit block is correctly received, the first bit block comprising at least one bit.

In one embodiment, the first signal indicates that a first bit block is correctly received, the first bit block comprising at least one bit.

In one embodiment, a transmission of the first signal explicitly indicates that after the first time, the target reference signal is used to determine the spatial relation of the transmission on the target channel.

In one embodiment, a transmission of the first signal implicitly indicates that after the first time, the target reference signal is used to determine the spatial relation of the transmission on the target channel.

In one embodiment, a transmitter transmitting the first signaling determines whether the first signaling is correctly received according to whether the first signal is received; if the first signal is received, it is determined that the first signaling is correctly received; if the first signal is not received, it is determined that the first signaling is not correctly received.

In one embodiment, a transmitter transmitting the first signaling judges, according to whether the first signal is received, whether the target reference signal is used to determine a spatial relation of a transmission on a target channel after the first time; if the first signal is received, it is then determined that after the first time, the target reference signal is used to determine the spatial relation of the transmission on the target channel; if the first signal is not received, it is then determined that after the first time, the spatial relation of the transmission on the target channel is unrelated to the target reference signal.

In one embodiment, a transmitter transmitting the first signaling determines, according to whether the first signal is received, whether the target reference signal is used to determine a spatial relation of a transmission on a target channel after the first time; if the first signal is received, it is then determined that after the first time, the target reference signal is used to determine the spatial relation of the transmission on the target channel; if the first signal is not received, it is then determined that after the first time, the second reference signal is used to determine the spatial relation of the transmission on the target channel.

In one embodiment, when a transmitter transmitting the first signaling determines that the first signaling is correctly received, it is determined that after the first time, the target reference signal is used to determine a spatial relation of a transmission on a target channel; when a transmitter transmitting the first signaling determines that the first signaling is not correctly received, it is determined that after the first time, the second reference signal is used to determine a spatial relation of a transmission on a target channel.

In one embodiment, when a transmitter transmitting the first signaling determines that the first signaling is correctly received, it is determined that after the first time, the target reference signal is used to determine a spatial relation of a transmission on a target channel; when a transmitter transmitting the first signaling determines that the first signaling is not correctly received, it is determined that after the first time, the spatial relation of the transmission on the target channel is unrelated to the target reference signal.

In one embodiment, when a transmitter transmitting the first signaling determines that the first signaling is correctly received, it is determined that after the first time, the target reference signal is used to determine a spatial relation of a transmission on a target channel; when a transmitter transmitting the first signaling determines that the first signaling is not correctly received, it is determined that after the first time, the second reference signal is used to determine a spatial relation of a transmission on a target channel.

In one embodiment, a transmitter transmitting the first signaling determines that the first signaling is correctly received according to a reception of the first signal and determines that after the first time, the target reference signal is used to determine a spatial relation of a transmission on a target channel.

Embodiment 6

Figure 6:
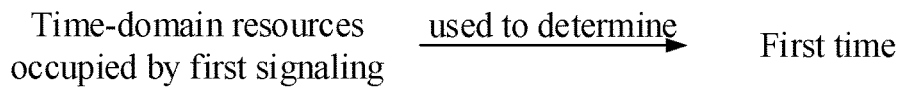
FIG. 6 illustrates a schematic diagram of a first signaling being used to determine a first time according to one embodiment of the present application.

Embodiment 6 illustrates a schematic diagram of a first signaling being used to determine a first time according to one embodiment of the present application; as shown in FIG. 6.

In Embodiment 6, time-domain resources occupied by the first signaling are used to determine a first time.

In one embodiment, the meaning of the phrase that "the first signaling being used to determine a first time" includes: time-domain resources occupied by the first signaling are used to determine a first time.

In one embodiment, time-domain resources occupied by the first signaling are no earlier than the first time.

In one embodiment, time-domain resources occupied by the first signaling are earlier than the first time.

In one embodiment, a time interval between the first time and a first reference time is a first interval; the first reference time is no later than the first time, time-domain resources occupied by the first signaling being used to determine the first reference time.

In one embodiment, the first reference time is a start time of time-domain resources occupied by the first signaling.

In one embodiment, the first reference time is an end time of time-domain resources occupied by the first signaling.

In one embodiment, the first reference time is a start time of a time unit to which the first signaling belongs in time domain.

In one embodiment, the first reference time is an end time of a time unit to which the first signaling belongs in time domain.

In one embodiment, a said time unit is a slot.

In one embodiment, a said time unit is a sub-slot.

In one embodiment, a said time unit is a symbol.

In one embodiment, a said time unit comprises a positive integer number of consecutive symbols.

In one embodiment, a number of symbol(s) comprised in a said time unit is configured by a higher-layer parameter.

In one embodiment, the first interval is measured in the time unit.

In one embodiment, the first interval is measured in slots.

In one embodiment, the first interval is measured in sub-slots.

In one embodiment, the first interval is measured in symbols.

In one embodiment, the first interval is measured in milliseconds (ms).

In one embodiment, the first interval is a non-negative integer.

In one embodiment, the first interval is equal to 0.

In one embodiment, the first interval is greater than 0.

In one embodiment, the first interval is fixed.

In one embodiment, the first interval is configured by a higher layer parameter.

In one embodiment, the first signaling indicates the first interval.

In one embodiment, the first signaling indicates the first time.

In one embodiment, the first interval is equal to a sum of a second interval and a third interval, where the second interval and the third interval are non-negative integers, respectively.

In one embodiment, the first signaling indicates the second interval and the third interval respectively.

In one embodiment, the first signaling indicates the second interval.

In one embodiment, the third interval is fixed.

In one embodiment, the third interval is configured by a higher layer parameter.

Embodiment 7

Figure 7:
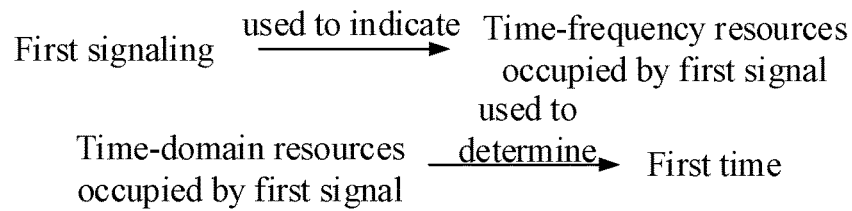
FIG. 7 illustrates a schematic diagram of a first signaling being used to determine a first time according to another embodiment of the present application.

Embodiment 7 illustrates a schematic diagram of a first signaling being used to determine a first time according to another embodiment of the present application; as shown in FIG. 7.

In Embodiment 7, the first signaling is used to indicate time-frequency resources occupied by the first signal; time-domain resources occupied by the first signal are used to determine the first time.

In one embodiment, the meaning of the phrase that "the first signaling being used to determine a first time" includes: the first signaling is used to determine time-domain resources occupied by the first signal, and time-domain resources occupied by the first signal are used to determine the first time.

In one embodiment, a time interval between the first time and a second reference time is a fourth interval; the second reference time is no later than the first time, where time-domain resources occupied by the first signal are used to determine the second reference time.

In one embodiment, the second reference time is a start time of time-domain resources occupied by the first signal.

In one embodiment, the second reference time is an end time of time-domain resources occupied by the first signal.

In one embodiment, the second reference time is a start time of a time unit occupied by the first signal.

In one embodiment, the second reference time is an end time of a time unit occupied by the first signal.

In one embodiment, the fourth interval is measured in the time unit.

In one embodiment, the fourth interval is measured in slots.

In one embodiment, the fourth interval is measured in sub-slots.

In one embodiment, the fourth interval is measured in symbols.

In one embodiment, the fourth interval is measured in milliseconds (ms).

In one embodiment, the fourth interval is a non-negative integer.

In one embodiment, the fourth interval is equal to 0.

In one embodiment, the fourth interval is greater than 0.

In one embodiment, the fourth interval is fixed.

In one embodiment, the fourth interval is configured by a higher layer parameter.

In one embodiment, the first signaling indicates the fourth interval.

In one embodiment, the first signaling is used to indicate time-domain resources occupied by the first signal.

In one embodiment, time-domain resources occupied by the first signaling are used to determine time-domain resources occupied by the first signal.

In one embodiment, the first signaling belongs to a first time unit in time domain, while the first signal belongs to a second time unit in time domain, where a time interval between the first time unit and the second time unit is a fifth interval.

In one embodiment, the second signal belongs to a first time unit in time domain, while the first signal belongs to a second time unit in time domain, where a time interval between the first time unit and the second time unit is a fifth interval.

In one embodiment, the fifth interval is default.

In one embodiment, the fifth interval is fixed.

In one embodiment, the first signaling indicates the fifth interval.

In one embodiment, the fifth interval is configured by a RRC signaling.

In one embodiment, the fifth interval is measured in the time unit.

In one embodiment, the fifth interval is measured in slots.

In one embodiment, the fifth interval is measured in symbols.

In one embodiment, the fifth interval is measured in milliseconds (ms).

In one embodiment, the fifth interval is a non-negative integer.

In one embodiment, the fifth interval is equal to 0.

In one embodiment, the fifth interval is greater than 0.

In one embodiment, an end time of the first time unit is no later than a start time of the second time unit.

In one embodiment, a time interval between two time units refers to: a time interval between a start time of a former one of the two time units and a start time of a latter one of the two time units.

In one embodiment, a time interval between two time units refers to: a time interval between an end time of a former one of the two time units and an end time of a latter one of the two time units.

In one embodiment, a time interval between two time units refers to: a time interval between an end time of a former one of the two time units and a start time of a latter one of the two time units.

In one embodiment, a position of a first symbol occupied by the first signal in the second time unit is configured by an RRC signaling.

In one embodiment, the first signaling indicates a position of a first symbol occupied by the first signal in the second time unit.

Embodiment 8

Figure 8:
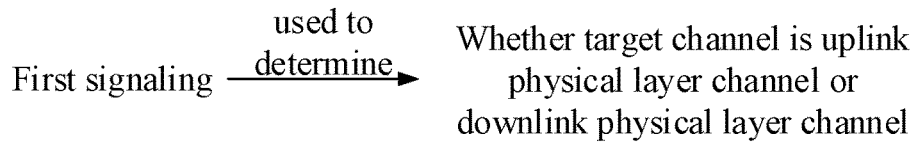
FIG. 8 illustrates a schematic diagram of a first signaling being used to determine whether a target channel is an uplink physical layer channel or a downlink physical layer channel according to one embodiment of the present application.

Embodiment 8 illustrates a schematic diagram of a first signaling being used to determine whether a target channel is an uplink physical layer channel or a downlink physical layer channel according to one embodiment of the present application; as shown in FIG. 8.

In one embodiment, the first signaling is used to indicate whether the target channel is an uplink physical layer channel or a downlink physical layer channel.

In one embodiment, the first signaling explicitly indicates whether the target channel is an uplink physical layer channel or a downlink physical layer channel.

In one embodiment, the first signaling implicitly indicates whether the target channel is an uplink physical layer channel or a downlink physical layer channel.

In one embodiment, when a first condition set is satisfied, the target channel is an uplink physical layer channel.

In one embodiment, when a first condition set is unsatisfied, the target channel is a downlink physical layer channel.

In one embodiment, the first signaling is used to determine whether a first condition set is satisfied.

In one embodiment, the first condition set only comprises one condition.

In one embodiment, the first condition set comprises more than one condition; when each condition in the first condition set is satisfied, the first condition set is satisfied; when there is one condition in the first condition set not being satisfied, the first condition set is unsatisfied.

In one embodiment, the first condition set comprises more than one condition; when any condition in the first condition set is satisfied, the first condition set is satisfied; when each condition in the first condition set is unsatisfied, the first condition set is unsatisfied.

In one embodiment, a signaling format of the first signaling is used to indicate whether the target channel is an uplink physical layer channel or a downlink physical layer channel.

In one embodiment, the first signaling is a DCI signaling, with the signaling format being a DCI format.

In one embodiment, whether a signaling format of the first signaling belongs to a first format set or a second format set is used to indicate whether the target channel is an uplink physical layer channel or a downlink physical layer channel.

In one embodiment, the first condition set comprises a first condition, the first condition comprising: a signaling format of the first signaling belonging to a first format set.

In one embodiment, the first condition set only comprises the first condition.

In one embodiment, when a signaling format of the first signaling belongs to a first format set, the first condition is satisfied.

In one embodiment, when a signaling format of the first signaling does not belong to a first format set, the first condition is unsatisfied.

In one embodiment, when a signaling format of the first signaling belongs to a second format set, the first condition is not satisfied.

In one embodiment, the first format set comprises at least one DCI format, while the second format set comprises at least one DCI format.

In one embodiment, there is one DCI format in the first format set that does not belong to the second format set.

In one embodiment, any DCI format in the first format set does not belong to the second format set.

In one embodiment, the first format set comprises at least one DownLink (DL) DCI format.

In one embodiment, the first format set comprises at least one UpLink (UL) DCI format.

In one embodiment, the first format set only comprises a UL DCI format.

In one embodiment, the first format set comprises DCI format 1_0.

In one embodiment, the first format set comprises at least one of DCI format 1_0, DCI format 0_0, DCI format 0_1 or DCI format 0_2.

In one embodiment, the second format set comprises at least one DL DCI format.

In one embodiment, the second format set comprises at least one UL DCI format.

In one embodiment, the second format set only comprises a DL DCI format.

In one embodiment, the second format set comprises DL DCI formats including DCI format 1_1 and DCI format 1_2.

In one embodiment, the second format set comprises at least one of DCI format 1_0, DCI format 1_1 or DCI format 1_2.

In one embodiment, the DL DCI formats include DCI format 1_1 and DCI format 1_2.

In one embodiment, the DL DCI formats include at least one of DCI format 10, DCI format 1_1 or DCI format 1_2.

In one embodiment, the UL DCI formats include DCI format 0_1 and DCI format 0_2.

In one embodiment, the UL DCI formats include at least one of DCI format 00, DCI format 0_1 or DCI format 0_2.

In one embodiment, for the specific definitions of the DCI format 1_0, the DCI format 1_1, the DCI format 12, the DCI format 00, the DCI format 0_1 and the DCI format 02, refer to 3GPP TS38.212, Section 7.3.1.

In one embodiment, control information carried by a first signaling is used to indicate whether the target channel is an uplink physical layer channel or a downlink physical layer channel.

In one embodiment, whether control information carried by a first signaling belongs to a first control information set or a second control information set is used to indicate whether the target channel is an uplink physical layer channel or a downlink physical layer channel.

In one embodiment, the first control information set comprises at least one information block, while the second control information set comprises at least one information block.

In one embodiment, there is an information block in the first control information set that does not belong to the second control information set.

In one embodiment, when control information carried by a first signaling belongs to a first control information set, the target channel is an uplink physical layer channel.

In one embodiment, when control information carried by a first signaling belongs to a second control information set, the target channel is a downlink physical layer channel.

In one embodiment, the first condition set comprises a second condition, the second condition comprising: control information carried by a first signaling belonging to a first control information set.

In one embodiment, the first condition set only comprises the second condition.

In one embodiment, when control information carried by the first signaling belongs to a first control information set, the second condition is satisfied.

In one embodiment, when control information carried by the first signaling does not belong to a first control information set, the second condition is unsatisfied.

In one embodiment, when control information carried by the first signaling belongs to a second control information set, the second condition is unsatisfied.

In one embodiment, whether the first signaling carries a first field set is used to indicate whether the target channel is an uplink physical layer channel or a downlink physical layer channel.

In one embodiment, the first field set comprises at least one field.

In one embodiment, the first field set only comprises one field.

In one embodiment, the first field set comprises more than one field.

In one embodiment, the field comprises at least one bit.

In one embodiment, for the specific definition of the field, refer to 3GPP TS38.212, Section 7.3.1.

In one embodiment, when the first signaling does not carry a first field set, the target channel is an uplink physical layer channel; when the first signaling carries a first field set, the target channel is a downlink physical layer channel.

In one embodiment, when the first signaling carries a first field set, the target channel is an uplink physical layer channel; when the first signaling does not carry a first field set, the target channel is a downlink physical layer channel.

In one embodiment, the first condition set comprises a third condition, the third condition comprising: the first signaling not carrying a first field set.

In one embodiment, the first condition set only comprises the third condition.

In one embodiment, when the first signaling does not carry a first field set, the third condition is satisfied.

In one embodiment, when the first signaling carries a first field set, the third condition is unsatisfied.

In one embodiment, at least one field in the first field set indicates DL assignment information.

In one embodiment, any field in the first field set indicates DL assignment information.

In one embodiment, the DL assignment information comprises: at least one of time-domain resources occupied by a DL transmission, frequency-domain resources occupied by a DL transmission, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), a transmission antenna port, or a corresponding Transmission Configuration Indicator (TCI) state.

In one subembodiment, the configuration information of the DMRS comprises at least one of a Reference Signal (RS) sequence, a mapping mode, a DMRS type, time-domain resources being occupied, frequency-domain resources being occupied, code-domain resources being occupied, a cyclic shift, or an Orthogonal Cover Code (OCC).

In one embodiment, the first field set comprises a Downlink assignment index field.

In one embodiment, the first field set comprises a Time domain resource assignment field and a Frequency domain resource assignment field.

In one embodiment, the specific definitions of the Downlink assignment index field, the Time domain resource assignment field and the Frequency domain resource assignment field can be found in 3GPP TS38.212, Section 7.3.1.1.

In one embodiment, whether a first signaling carries DL assignment information is used to indicate whether the target channel is an uplink physical layer channel or a downlink physical layer channel.

In one embodiment, when the first signaling does not carry DL assignment information, the target channel is an uplink physical layer channel; when the first signaling carries DL assignment information, the target channel is a downlink physical layer channel.

In one embodiment, whether the first signaling comprises a first field set is used to indicate whether the first signaling carries DL assignment information.

In one embodiment, when the first signaling does not comprise a first field set, the first signaling does not carry DL assignment information; when the first signaling comprises a first field set, the first signaling carries DL assignment information.

In one embodiment, the first condition set comprises a fourth condition, the fourth condition comprising: the first signaling not carrying DL assignment information.

In one embodiment, the first condition set only comprises the fourth condition.

In one embodiment, when the first signaling does not carry DL assignment information, the fourth condition is satisfied.

In one embodiment, when the first signaling carries DL assignment information, the fourth condition is not satisfied.

In one embodiment, the first signaling comprises a second field set, where a value of the second field set in the first signaling is used to indicate whether the target channel is an uplink physical layer channel or a downlink physical layer channel.

In one embodiment, the first signaling comprises a second field set, where whether a value of the second field set in the first signaling belongs to a first value set is used to indicate whether the target channel is an uplink physical layer channel or a downlink physical layer channel.

In one embodiment, the first signaling comprises a second field set, when a value of the second field set in the first signaling belongs to a first value set, the target channel is an uplink physical layer channel.

In one embodiment, the first signaling comprises a second field set, when a value of the second field set in the first signaling does not belong to a first value set, the target channel is a downlink physical layer channel.

In one embodiment, the first signaling comprises a second field set, where whether a value of the second field set in the first signaling is a first value set is used to indicate whether the target channel is an uplink physical layer channel or a downlink physical layer channel.

In one embodiment, the first signaling comprises a second field set, when a value of the second field set in the first signaling is a first value set, the target channel is an uplink physical layer channel.

In one embodiment, the first signaling comprises a second field set, when a value of the second field set in the first signaling is not a first value set, the target channel is a downlink physical layer channel.

In one embodiment, the first condition set comprises a fifth condition, the fifth condition comprising: the first signaling comprises a second field set, where a value of the second field set in the first signaling belongs to a first value set.

In one embodiment, the first condition set comprises a fifth condition, the fifth condition comprising: the first signaling comprises a second field set, where a value of the second field set in the first signaling is a first value set.

In one embodiment, the first condition set only comprises the fifth condition.

In one embodiment, when a value of the second field set in the first signaling belongs to a first value set, the fifth condition is satisfied.

In one embodiment, when a value of the second field set in the first signaling does not belong to a first value set, the fifth condition is unsatisfied.

In one embodiment, when a value of the second field set in the first signaling is a first value set, the fifth condition is satisfied.

In one embodiment, when a value of the second field set in the first signaling is not a first value set, the fifth condition is unsatisfied.

In one embodiment, the first value set is fixed.

In one embodiment, the first value set is pre-defined.

In one embodiment, the first value set is configurable.

In one embodiment, a value of the second field set is a Codepoint of the second field set.

In one embodiment, a value of the second field set is comprised of values of respective bits comprised by the second field set.

In one embodiment, the second field set comprises M fields, M being a positive integer greater than 1; a value of the second field set consists of values of the M fields collectively.

In one embodiment, a value of a field is a Codepoint of the field.

In one embodiment, a value of a field is comprised of values of respective bits comprised by the field.

In one embodiment, the first value set comprises M values, the M values respectively corresponding to the M fields.

In one embodiment, at least one value among the M values is equal to 0.

In one embodiment, any value among the M values includes at least one 0.

In one embodiment, each of the M values is equal to 0.

In one embodiment, the first value set is equal to 0.

In one embodiment, the first value set comprises 0.

In one embodiment, the first value set comprises at least one 0.

In one embodiment, the first value set consists of at least one 0.

In one embodiment, the first value set comprises at least one 1.

In one embodiment, the first value set consists of at least one of 0 or 1.

In one embodiment, the first signaling comprises a second field set, where whether all bits comprised by the second field set in the first signaling are all-0 is used to indicate whether the target channel is an uplink physical layer channel or a downlink physical layer channel.

In one embodiment, the first signaling comprises a second field set, when values of all bits comprised by the second field set in the first signaling are all-0, the target channel is an uplink physical layer channel.

In one embodiment, the first signaling comprises a second field set, when there is one bit comprised by the second field set in the first signaling of which the value equals 1, the target channel is a downlink physical layer channel.

In one embodiment, the first condition set comprises a sixth condition, the sixth condition comprising: the first signaling comprises a second field set, where all bits comprised by the second field set in the first signaling are all-0.

In one embodiment, the first condition set only comprises the sixth condition.

In one embodiment, when all bits comprised by the second field set in the first signaling are all-0, the sixth condition is satisfied.

In one embodiment, when there is one bit comprised by the second field set in the first signaling being 1, the sixth condition is not satisfied.

In one embodiment, the second field set comprises at least one of a HARQ process number field, a Redundancy version field, a Modulation and coding scheme field or a Frequency domain resource assignment field.

In one embodiment, the second field set comprises a HARQ process number field and a Redundancy version field.

In one embodiment, the second field set comprises a Redundancy version field.

In one embodiment, the second field set comprises a HARQ process number field, a Redundancy version field, a Modulation and coding scheme field and a Frequency domain resource assignment field.

In one embodiment, the second field set comprises a Redundancy version field, a Modulation and coding scheme field and a Frequency domain resource assignment field.

In one embodiment, the first condition set comprises a seventh condition, the seventh condition comprising: bits comprised by a HARQ process number field and a Redundancy version field in the first signaling are all-0; bits comprised by a Modulation and coding scheme field in the first signaling are all-0; and bits comprised by a Frequency domain resource assignment field in the first signaling are all-0 or all-1.

In one embodiment, the first condition set comprises an eighth condition, the eighth condition comprising: bits comprised by a Redundancy version field in the first signaling are all-0; bits comprised by a Modulation and coding scheme field in the first signaling are all-0; and bits comprised by a Frequency domain resource assignment field in the first signaling are all-0 or all-1.

In one embodiment, time-frequency resources occupied by the first signaling are used to indicate whether the target channel is an uplink physical layer channel or a downlink physical layer channel.

In one embodiment, when time-frequency resources occupied by the first signaling belong to a first time-frequency resource set, the target channel is an uplink physical layer channel; when time-frequency resources occupied by the first signaling belong to a second time-frequency resource set, the target channel is a downlink physical layer channel.

In one embodiment, the first condition set comprises a ninth condition, the ninth condition comprising: time-frequency resources occupied by the first signaling belonging to a first time-frequency resource set.

In one embodiment, when time-frequency resources occupied by the first signaling belong to a first time-frequency resource set, the ninth condition is satisfied; when time-frequency resources occupied by the first signaling do not belong to a first time-frequency resource set, the ninth condition is unsatisfied.

In one embodiment, when time-frequency resources occupied by the first signaling belong to a first time-frequency resource set, the ninth condition is satisfied; when time-frequency resources occupied by the first signaling belong to a second time-frequency resource set, the ninth condition is unsatisfied.

In one embodiment, the first time-frequency resource set is different from the second time-frequency resource set.

In one embodiment, any RE in the first time-frequency resource set does not belong to the second time-frequency resource set.

In one embodiment, the first time-frequency resource set and the second time-frequency resource set are orthogonal.

In one embodiment, the first time-frequency resource set and the second time-frequency resource set respectively comprise two search space sets.

In one embodiment, the first time-frequency resource set and the second time-frequency resource set respectively comprise two COntrol REsource SETs (CORESETs).

In one embodiment, the first time-frequency resource set and the second time-frequency resource set respectively comprise two groups of COntrol REsource SETs (CORESETs), where any of the two groups of CORESETs comprises at least one CORESET.

In one embodiment, the first time-frequency resource set and the second time-frequency resource set respectively comprise two PDCCH candidates.

In one embodiment, the first time-frequency resource set and the second time-frequency resource set respectively comprise two groups of PDCCH candidates, where any of the two groups of PDCCH candidates comprises at least one PDCCH candidate.

Embodiment 9

Figure 9:
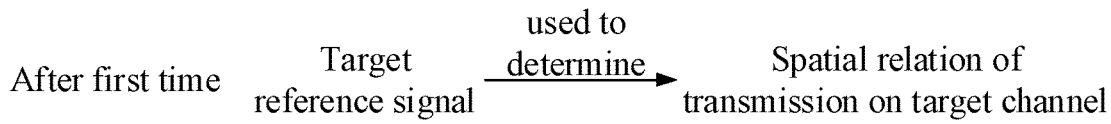
FIG. 9 illustrates a schematic diagram of a spatial relation of a transmission on a target channel according to one embodiment of the present application.

Embodiment 9 illustrates a schematic diagram of a spatial relation of a transmission on a target channel according to one embodiment of the present application; as shown in FIG. 9.

In Embodiment 9, after the first time, the target reference signal is used to determine the spatial relation of the transmission on the target channel.

In one embodiment, a given reference signal is used to determine a spatial relation of a given transmission.

In one subembodiment, the given reference signal is the target reference signal, and the given transmission is a transmission on the target channel after the first time.

In one subembodiment, the given reference signal is a second reference signal, and the given transmission is a transmission on the target channel before the first time.

In one subembodiment, the given reference signal is a reference signal in the first reference signal set, and the given transmission is a transmission on an uplink physical layer channel.

In one subembodiment, a TCI state of the given reference signal is used to determine a spatial relation of the given transmission.

In one subembodiment, the spatial relation comprises a TCI state, where a TCI state of the given reference signal is identical to a TCI state of the given transmission.

In one subembodiment, a QCL parameter of the given reference signal is used to determine a spatial relation of the given transmission.

In one subembodiment, the spatial relation comprises a QCL parameter, where a QCL parameter of the given reference signal is identical to a QCL parameter of the given transmission.

In one subembodiment, a spatial domain filter for the given reference signal is used to determine a spatial relation of the given transmission.

In one subembodiment, the spatial relation comprises a spatial domain filter, where a spatial domain filter for the given reference signal is identical to a spatial domain filter for the given transmission.

In one subembodiment, the given reference signal is an uplink signal, and the given transmission is an uplink transmission, the spatial relation comprising a spatial domain transmission filter, where a spatial domain transmission filter for the given reference signal is identical to a spatial domain transmission filter for the given transmission.

In one subembodiment, the given reference signal is an uplink signal, and the given transmission is an uplink transmission, the spatial relation comprising a spatial domain reception filter, where a spatial domain reception filter for the given reference signal is identical to a spatial domain reception filter for the given transmission.

In one subembodiment, the given reference signal is an uplink signal, and the given transmission is a downlink transmission, the spatial relation comprising a spatial domain transmission filter, where a spatial domain reception filter for the given reference signal is identical to a spatial domain transmission filter for the given transmission.

In one subembodiment, the given reference signal is an uplink signal, and the given transmission is a downlink transmission, the spatial relation comprising a spatial domain reception filter, where a spatial domain transmission filter for the given reference signal is identical to a spatial domain reception filter for the given transmission.

In one subembodiment, the given reference signal is a downlink signal, and the given transmission is an uplink transmission, the spatial relation comprising a spatial domain transmission filter, where a spatial domain reception filter for the given reference signal is identical to a spatial domain transmission filter for the given transmission.

In one subembodiment, the given reference signal is a downlink signal, and the given transmission is an uplink transmission, the spatial relation comprising a spatial domain reception filter, where a spatial domain transmission filter for the given reference signal is identical to a spatial domain reception filter for the given transmission.

In one subembodiment, the given reference signal is a downlink signal, and the given transmission is a downlink transmission, the spatial relation comprising a spatial domain transmission filter, where a spatial domain transmission filter for the given reference signal is identical to a spatial domain transmission filter for the given transmission.

In one subembodiment, the given reference signal is a downlink signal, and the given transmission is a downlink transmission, the spatial relation comprising a spatial domain reception filter, where a spatial domain reception filter for the given reference signal is identical to a spatial domain reception filter for the given transmission.

In one subembodiment, a spatial parameter of the given reference signal is used to determine a spatial relation of the given transmission.

In one subembodiment, the spatial relation comprises a spatial parameter, where a spatial parameter of the given reference signal is identical to a spatial parameter of the given transmission.

In one subembodiment, the spatial relation comprises a spatial Tx parameter, where a spatial parameter of the given reference signal is identical to a spatial Tx parameter of the given transmission.

In one subembodiment, the spatial relation comprises a spatial Tx parameter, the given reference signal is an uplink signal, and the given transmission is an uplink transmission, where a spatial Tx parameter of the given reference signal is identical to a spatial Tx parameter of the given transmission.

In one subembodiment, the spatial relation comprises a spatial Rx parameter, the given reference signal is an uplink signal, and the given transmission is an uplink transmission, where a spatial Rx parameter of the given reference signal is identical to a spatial Rx parameter of the given transmission.

In one subembodiment, the spatial relation comprises a spatial Tx parameter, the given reference signal is a downlink signal, and the given transmission is a downlink transmission, where a spatial Tx parameter of the given reference signal is identical to a spatial Tx parameter of the given transmission.

In one subembodiment, the spatial relation comprises a spatial Rx parameter, the given reference signal is a downlink signal, and the given transmission is a downlink transmission, where a spatial Rx parameter of the given reference signal is identical to a spatial Rx parameter of the given transmission.

In one subembodiment, the spatial relation comprises a spatial Tx parameter, the given reference signal is a downlink signal, and the given transmission is an uplink transmission, where a spatial Rx parameter of the given reference signal is identical to a spatial Tx parameter of the given transmission.

In one subembodiment, the spatial relation comprises a spatial Rx parameter, the given reference signal is a downlink signal, and the given transmission is an uplink transmission, where a spatial Tx parameter of the given reference signal is identical to a spatial Rx parameter of the given transmission.

In one subembodiment, the spatial relation comprises a spatial Tx parameter, the given reference signal is an uplink signal, and the given transmission is a downlink transmission, where a spatial Rx parameter of the given reference signal is identical to a spatial Tx parameter of the given transmission.

In one subembodiment, the spatial relation comprises a spatial Rx parameter, the given reference signal is an uplink signal, and the given transmission is a downlink transmission, where a spatial Tx parameter of the given reference signal is identical to a spatial Rx parameter of the given transmission.

In one embodiment, the spatial relation comprises a Quasi co-location (QCL) parameter.

In one embodiment, the spatial relation comprises a spatial domain filter.

In one embodiment, the spatial relation comprises a spatial domain transmission filter.

In one embodiment, the spatial relation comprises a Spatial domain reception filter.

In one embodiment, the spatial relation comprises a Spatial domain transmission filter and a Spatial domain reception filter.

In one embodiment, the spatial relation comprises Spatial parameters.

In one embodiment, the spatial parameter comprises a Spatial Tx parameter.

In one embodiment, the spatial parameter comprises a Spatial Rx parameter.

In one embodiment, the spatial parameter comprises a Spatial Tx parameter and a Spatial Rx parameter.

In one embodiment, the Spatial Tx parameters include one or more of a transmission antenna port, a transmission antenna port group, a transmission analog beamforming matrix, a transmission analog beamforming vector, a transmission beamforming matrix, a transmission beamforming vector or a spatial domain transmission filter.

In one embodiment, the Spatial Rx parameters include one or more of a receiving beam, a reception analog beamforming matrix, a reception analog beamforming vector, a reception beamforming matrix, a reception beamforming vector or a spatial domain reception filter.

In one embodiment, the spatial domain filter includes a spatial domain transmission filter.

In one embodiment, the spatial domain filter includes a spatial domain reception filter.

In one embodiment, the spatial domain filter includes a spatial domain transmission filter and a spatial domain reception filter.

In one embodiment, the QCL refers to being Quasi-Co-Located.

In one embodiment, the QCL refers to Quasi-Co-Location.

In one embodiment, the QCL includes QCL Type-A.
In one embodiment, the QCL includes QCL Type-B.
In one embodiment, the QCL includes QCL Type-C.
In one embodiment, the QCL includes QCL Type-D.

In one embodiment, for the specific definitions of the QCL Type-A, the QCL Type-B, the QCL T e-C and the QCL Type-D, refer to 3GPP TS38.214, Section 5.1.5.

In one embodiment, the QCL parameter includes one or more of a delay spread, a Doppler spread, a Doppler shift, an average delay or a Spatial Rx parameter.

Embodiment 10

Figure 10:
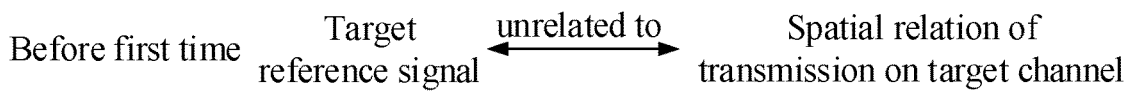
FIG. 10 illustrates a schematic diagram of a spatial relation of a transmission on a target channel according to another embodiment of the present application.

Embodiment 10 illustrates a schematic diagram of a spatial relation of a transmission on a target channel according to another embodiment of the present application; as shown in FIG. 10.

In Embodiment 10, before the first time, the spatial relation of the transmission on the target channel is unrelated to the target reference signal.

In one embodiment, before the first time, a second reference signal is used to determine a spatial relation of a transmission on the target channel, the second reference signal being different from the target reference signal.

In one embodiment, the second reference signal and the target reference signal are non-QCL.

In one embodiment, a spatial domain filter for the second reference signal is different from a spatial domain filter for the target reference signal.

In one embodiment, the phrase that "a spatial relation of a given transmission is unrelated to a given reference signal" means that: a TCI state of the given reference signal is unrelated to a spatial relation of the given transmission.

In one embodiment, the phrase that "a spatial relation of a given transmission is unrelated to a given reference signal" means that: the spatial relation comprises a TCI state, where a TCI state of the given reference signal is different from a TCI state of the given transmission.

In one embodiment, the phrase that "a spatial relation of a given transmission is unrelated to a given reference signal"

means that: a QCL parameter of the given reference signal is unrelated to a spatial relation of the given transmission.

In one embodiment, the phrase that "a spatial relation of a given transmission is unrelated to a given reference signal" means that: the spatial relation comprises a QCL parameter, where a QCL parameter of the given reference signal is different from a QCL parameter of the given transmission.

In one embodiment, the phrase that "a spatial relation of a given transmission is unrelated to a given reference signal" means that: a spatial domain filter for the given reference signal is unrelated to a spatial relation of the given transmission.

In one embodiment, the phrase that "a spatial relation of a given transmission is unrelated to a given reference signal" means that: the spatial relation comprises a spatial domain filter, where a spatial domain filter of the given reference signal is different from a spatial domain filter of the given transmission.

In one embodiment, the phrase that "a spatial relation of a given transmission is unrelated to a given reference signal" means that: the given reference signal is an uplink signal, and the given transmission is an uplink transmission, the spatial relation comprising a spatial domain transmission filter, where a spatial domain transmission filter for the given reference signal is different from a spatial domain transmission filter for the given transmission.

In one embodiment, the phrase that "a spatial relation of a given transmission is unrelated to a given reference signal" means that: the given reference signal is an uplink signal, and the given transmission is an uplink transmission, the spatial relation comprising a spatial domain reception filter, where a spatial domain reception filter for the given reference signal is different from a spatial domain reception filter for the given transmission.

In one embodiment, the phrase that "a spatial relation of a given transmission is unrelated to a given reference signal" means that: the given reference signal is an uplink signal, and the given transmission is a downlink transmission, the spatial relation comprising a spatial domain transmission filter, where a spatial domain reception filter for the given reference signal is different from a spatial domain transmission filter for the given transmission.

In one embodiment, the phrase that "a spatial relation of a given transmission is unrelated to a given reference signal" means that: the given reference signal is an uplink signal, and the given transmission is a downlink transmission, the spatial relation comprising a spatial domain reception filter, where a spatial domain transmission filter for the given reference signal is different from a spatial domain reception filter for the given transmission.

In one embodiment, the phrase that "a spatial relation of a given transmission is unrelated to a given reference signal" means that: the given reference signal is a downlink signal, and the given transmission is an uplink transmission, the spatial relation comprising a spatial domain transmission filter, where a spatial domain reception filter for the given reference signal is different from a spatial domain transmission filter for the given transmission.

In one embodiment, the phrase that "a spatial relation of a given transmission is unrelated to a given reference signal" means that: the given reference signal is a downlink signal, and the given transmission is an uplink transmission, the spatial relation comprising a spatial domain reception filter, where a spatial domain transmission filter for the given reference signal is different from a spatial domain reception filter for the given transmission.

In one embodiment, the phrase that "a spatial relation of a given transmission is unrelated to a given reference signal" means that: the given reference signal is a downlink signal, and the given transmission is a downlink transmission, the spatial relation comprising a spatial domain transmission filter, where a spatial domain transmission filter for the given reference signal is different from a spatial domain transmission filter for the given transmission.

In one embodiment, the phrase that "a spatial relation of a given transmission is unrelated to a given reference signal" means that: the given reference signal is a downlink signal, and the given transmission is a downlink transmission, the spatial relation comprising a spatial domain reception filter, where a spatial domain reception filter for the given reference signal is different from a spatial domain reception filter for the given transmission.

In one embodiment, the phrase that "a spatial relation of a given transmission is unrelated to a given reference signal" means that: a spatial parameter of the given reference signal is unrelated to a spatial relation of the given transmission.

In one embodiment, the phrase that "a spatial relation of a given transmission is unrelated to a given reference signal" means that: the spatial relation comprises a spatial parameter, where a spatial parameter of the given reference signal is different from a spatial parameter of the given transmission.

In one embodiment, the phrase that "a spatial relation of a given transmission is unrelated to a given reference signal" means that: the spatial relation comprises a spatial Tx parameter, where a spatial parameter of the given reference signal is different from a spatial Tx parameter of the given transmission.

In one embodiment, the phrase that "a spatial relation of a given transmission is unrelated to a given reference signal" means that: the spatial relation comprises a spatial Tx parameter, the given reference signal is an uplink signal, and the given transmission is an uplink transmission, where a spatial Tx parameter of the given reference signal is different from a spatial Tx parameter of the given transmission.

In one embodiment, the phrase that "a spatial relation of a given transmission is unrelated to a given reference signal" means that: the spatial relation comprises a spatial Rx parameter, the given reference signal is an uplink signal, and the given transmission is an uplink transmission, where a spatial Rx parameter of the given reference signal is different from a spatial Rx parameter of the given transmission.

In one embodiment, the phrase that "a spatial relation of a given transmission is unrelated to a given reference signal" means that: the spatial relation comprises a spatial Tx parameter, the given reference signal is a downlink signal, and the given transmission is a downlink transmission, where a spatial Tx parameter of the given reference signal is different from a spatial Tx parameter of the given transmission.

In one embodiment, the phrase that "a spatial relation of a given transmission is unrelated to a given reference signal" means that: the spatial relation comprises a spatial Rx parameter, the given reference signal is a downlink signal, and the given transmission is a downlink transmission, where a spatial Rx parameter of the given reference signal is different from a spatial Rx parameter of the given transmission.

In one embodiment, the phrase that "a spatial relation of a given transmission is unrelated to a given reference signal" means that: the spatial relation comprises a spatial Tx parameter, the given reference signal is a downlink signal, and the given transmission is an uplink transmission, where a spatial Rx parameter of the given reference signal is different from a spatial Tx parameter of the given transmission.

In one embodiment, the phrase that "a spatial relation of a given transmission is unrelated to a given reference signal" means that: the spatial relation comprises a spatial Rx parameter, the given reference signal is a downlink signal, and the given transmission is an uplink transmission, where a spatial Tx parameter of the given reference signal is different from a spatial Rx parameter of the given transmission.

In one embodiment, the phrase that "a spatial relation of a given transmission is unrelated to a given reference signal" means that: the spatial relation comprises a spatial Tx parameter, the given reference signal is an uplink signal, and the given transmission is a downlink transmission, where a spatial Rx parameter of the given reference signal is different from a spatial Tx parameter of the given transmission.

In one embodiment, the phrase that "a spatial relation of a given transmission is unrelated to a given reference signal" means that: the spatial relation comprises a spatial Rx parameter, the given reference signal is an uplink signal, and the given transmission is a downlink transmission, where a spatial Tx parameter of the given reference signal is different from a spatial Rx parameter of the given transmission.

In one embodiment, the given reference signal is the target reference signal, and the given transmission is a transmission on the target channel before the first time.

Embodiment 11

Figure 11:
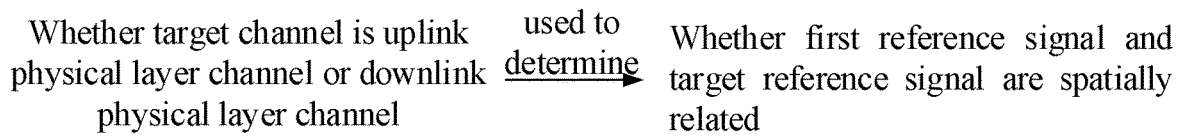
FIG. 11 illustrates a schematic diagram of a relation between whether a first reference signal and a target reference signal are spatially related and a target channel according to one embodiment of the present application.

Embodiment 11 illustrates a schematic diagram of a relation between whether a first reference signal and a target reference signal are spatially related and a target channel according to one embodiment of the present application; as shown in FIG. 11.

In Embodiment 11, whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, when the target channel is an uplink physical layer channel, whether the first reference signal belongs to a first reference signal set is used to determine whether the first reference signal and the target reference signal are spatially related.

In one embodiment, the first reference signal set comprises at least one reference signal.

In one embodiment, the first reference signal set only comprises one reference signal.

In one embodiment, the first reference signal set comprises more than one reference signal.

In one embodiment, the first reference signal set comprises a downlink reference signal.

In one embodiment, the first reference signal set comprises an uplink reference signal.

In one embodiment, the first reference signal set comprises at least one of a downlink reference signal or an uplink reference signal.

In one embodiment, the first reference signal set is associated with the uplink physical layer channel.

In one embodiment, the phrase that "the first reference signal set is associated with the uplink physical layer channel" means that: at least one reference signal in the first reference signal set is used to determine a spatial relation of a transmission on an uplink physical layer channel.

In one embodiment, the phrase that "the first reference signal set is associated with the uplink physical layer channel" means that: the first reference signal set comprises a downlink reference signal, and measurement(s) of at least one reference signal in the first reference signal set is(are) used to determine a precoder of a signal transmitted on an uplink physical layer channel.

In one embodiment, the phrase that "the first reference signal set is associated with the uplink physical layer channel" means that: the first reference signal set comprises a downlink reference signal, and measurement(s) of at least one reference signal in the first reference signal set is(are) used to calculate a precoder of a signal transmitted on an uplink physical layer channel.

In one embodiment, the phrase that "the first reference signal set is associated with the uplink physical layer channel" means that: at least one reference signal in a third reference signal set is used to determine a precoder of a signal transmitted on the uplink physical layer channel, where the third reference signal set is associated with the first reference signal set.

Embodiment 12

Figure 12:
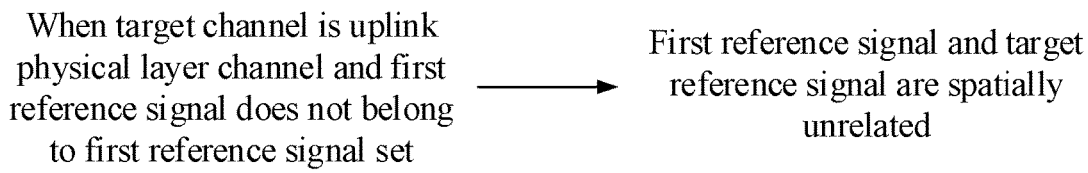
FIG. 12 illustrates a schematic diagram of a relation between whether a first reference signal and a target reference signal are spatially related and a target channel according to another embodiment of the present application.

Embodiment 12 illustrates a schematic diagram of a relation between whether a first reference signal and a target reference signal are spatially related and a target channel according to another embodiment of the present application; as shown in FIG. 12.

In Embodiment 12, when the target channel is an uplink physical layer channel and the first reference signal does not belong to the first reference signal set, the first reference signal and the target reference signal are spatially unrelated.

In one embodiment, the phrase that "the first reference signal does not belong to the first reference signal set" means that: the first reference signal is not a reference signal in the first reference signal set.

In one embodiment, the phrase that "the first reference signal does not belong to the first reference signal set" means that: the first reference signal is a reference signal other than the first reference signal set.

In one embodiment, the phrase that "the first reference signal does not belong to the first reference signal set" means that: the first reference signal belongs to the second reference signal set.

Embodiment 13

Embodiment 13 illustrates a schematic diagram of a relation between whether a first reference signal and a target reference signal are spatially related and a target channel according to another embodiment of the present application; as shown in FIG. 13.

In Embodiment 13, when the target channel is a downlink physical layer channel, the first reference signal and the target reference signal are spatially unrelated.

Embodiment 14

Embodiment 14 illustrates a schematic diagram of a relation between whether a first reference signal and a target reference signal are spatially related and a target channel according to another embodiment of the present application; as shown in FIG. 14.

In Embodiment 14, when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

In one embodiment, the second reference signal set is different from the first reference signal set.

In one embodiment, any reference signal in the second reference signal set does not belong to the first reference signal set.

In one embodiment, the second reference signal set comprises at least one reference signal.

In one embodiment, the second reference signal set only comprises one reference signal.

In one embodiment, the second reference signal set comprises more than one reference signal.

In one embodiment, the second reference signal set comprises a downlink reference signal.

In one embodiment, the second reference signal set comprises an uplink reference signal.

In one embodiment, the second reference signal set comprises at least one of a downlink reference signal or an uplink reference signal.

In one embodiment, the second reference signal set is associated with the downlink physical layer channel.

In one embodiment, the phrase that "the second reference signal set is associated with the downlink physical layer channel" means that: at least one reference signal in the second reference signal set is used to determine a TCI state of a transmission on the downlink physical layer channel.

In one embodiment, the phrase that "the second reference signal set is associated with the downlink physical layer channel" means that: at least one reference signal in the second reference signal set is used to determine a spatial relation of a transmission on the downlink physical layer channel.

In one embodiment, the phrase that "the second reference signal set is associated with the downlink physical layer channel" means that: the second reference signal set comprises an uplink reference signal, and measurement(s) of at least one reference signal in the second reference signal set is(are) used to determine a precoder of a signal transmitted on the downlink physical layer channel.

In one embodiment, the phrase that "the second reference signal set is associated with the downlink physical layer channel" means that: at least one reference signal in the second reference signal set is used to determine a precoder of a signal transmitted on the downlink physical layer channel.

In one embodiment, when the target channel is a downlink physical layer channel, whether the first reference signal belongs to a second reference signal set is used to determine whether the first reference signal and the target reference signal are spatially related.

In one embodiment, the phrase that "the first reference signal belongs to the second reference signal set" means that: the first reference signal is a reference signal in the first reference signal set.

In one embodiment, the phrase that "the first reference signal belongs to the second reference signal set" means that: the first reference signal does not belong to the first reference signal set.

In one embodiment, the phrase that "the first reference signal does not belong to the second reference signal set" means that: the first reference signal is a reference signal other than the second reference signal set.

In one embodiment, the phrase that "the first reference signal does not belong to the second reference signal set" means that: the first reference signal belongs to the first reference signal set.

Embodiment 15

Embodiment 15 illustrates a structure block diagram of a processing device used in a first node according to one embodiment of the present application; as shown in FIG. 15. In FIG. 15, a processing device 1200 in a first node comprises a first receiver 1201 and a first transmitter 1202, where the first transmitter 1202 is optional.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

The first receiver 1201 receives a first signaling, the first signaling being used to determine a first time; and receives a first reference signal after the first time.

In Embodiment 15, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, when the target channel is an uplink physical layer channel and the first reference signal does not belong to the first reference signal set, the first reference signal and the target reference signal are spatially unrelated.

In one embodiment, when the target channel is a downlink physical layer channel, the first reference signal and the target reference signal are spatially unrelated.

In one embodiment, when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

In one embodiment, the first node comprises:
a first transmitter 1202, transmitting a third reference signal set;

herein, the target channel is an uplink physical layer channel, and at least one reference signal in the third reference signal set is used to determine a precoder of a signal transmitted on the target channel; the third reference signal set is associated with the first reference signal set.

In one embodiment, before the first time, the spatial relation of the transmission on the target channel is unrelated to the target reference signal.

In one embodiment, the first node comprises:
the first transmitter 1202, transmitting a first signal;
where the first signaling is used to indicate time-frequency resources occupied by the first signal; the transmission of the first signal is used to indicate that after the first time, the target reference signal is used to determine the spatial relation of the transmission on the target channel.

Embodiment 16

Embodiment 16 illustrates a structure block diagram of a processing device used in a second node according to one embodiment of the present application; as shown in FIG. 16. In FIG. 16, a processing device 1300 in a second node comprises a second transmitter 1301 and a second receiver 1302, where the second receiver 1302 is optional.

In one embodiment, the second node is a base station.
In one embodiment, the second node is a UE.
In one embodiment, the second node is a relay node.
In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418,
the receiving processor 470, the multi-antenna receiving processor 472, the controller/processor 475 or the memory 476 in Embodiment 4.

The second transmitter 1301 transmits a first signaling, the first signaling being used to determine a first time; and transmits a first reference signal after the first time.

In Embodiment 16, the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

In one embodiment, when the target channel is an uplink physical layer channel and the first reference signal does not belong to the first reference signal set, the first reference signal and the target reference signal are spatially unrelated.

In one embodiment, when the target channel is a downlink physical layer channel, the first reference signal and the target reference signal are spatially unrelated.

In one embodiment, when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

In one embodiment, the second node comprises:
a second receiver 1302, receiving a third reference signal set;
herein, the target channel is an uplink physical layer channel, and at least one reference signal in the third reference signal set is used to determine a precoder of a signal transmitted on the target channel; the third reference signal set is associated with the first reference signal set.

In one embodiment, before the first time, the spatial relation of the transmission on the target channel is unrelated to the target reference signal.

In one embodiment, the second node comprises:
the second receiver 1302, receiving a first signal;
where the first signaling is used to indicate time-frequency resources occupied by the first signal; the transmission of the first signal is used to indicate that after the first time, the target reference signal is used to determine the spatial relation of the transmission on the target channel.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (JOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:
1. A first node for wireless communications, comprising:
a first receiver, receiving a first signaling, the first signaling being used to determine a first time; and receiving a first reference signal after the first time;
wherein the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel;

whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

2. The first node according to claim 1, characterized in that when the target channel is an uplink physical layer channel and the first reference signal does not belong to the first reference signal set, the first reference signal and the target reference signal are spatially unrelated.

3. The first node according to claim 1, characterized in that when the target channel is a downlink physical layer channel, the first reference signal and the target reference signal are spatially unrelated;

or, when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

4. The first node according to claim 1, comprising:

a first transmitter, transmitting a third reference signal set;

wherein the target channel is an uplink physical layer channel, and at least one reference signal in the third reference signal set is used to determine a precoder of a signal transmitted on the target channel; the third reference signal set is associated with the first reference signal set.

5. The first node according to claim 1, characterized in that before the first time, the spatial relation of the transmission on the target channel is unrelated to the target reference signal;

or, comprising: a first transmitter, transmitting a first signal; where the first signaling is used to indicate time-frequency resources occupied by the first signal; the transmission of the first signal is used to indicate that after the first time, the target reference signal is used to determine the spatial relation of the transmission on the target channel.

6. A second node for wireless communications, comprising:

a second transmitter, transmitting a first signaling, the first signaling being used to determine a first time; and transmitting a first reference signal after the first time;

wherein the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

7. The second node according to claim 6, characterized in that when the target channel is an uplink physical layer channel and the first reference signal does not belong to the first reference signal set, the first reference signal and the target reference signal are spatially unrelated.

8. The second node according to claim 6, characterized in that when the target channel is a downlink physical layer channel, the first reference signal and the target reference signal are spatially unrelated;

or, when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

9. The second node according to claim 6, characterized in that a second receiver, receiving a third reference signal set;

wherein the target channel is an uplink physical layer channel, and at least one reference signal in the third reference signal set is used to determine a precoder of a signal transmitted on the target channel; the third reference signal set is associated with the first reference signal set.

10. The second node according to claim 6, characterized in that before the first time, the spatial relation of the transmission on the target channel is unrelated to the target reference signal;

or, a second receiver, receiving a first signal; where the first signaling is used to indicate time-frequency resources occupied by the first signal; the transmission of the first signal is used to indicate that after the first time, the target reference signal is used to determine the spatial relation of the transmission on the target channel.

11. A method in a first node for wireless communications, comprising:

receiving a first signaling, the first signaling being used to determine a first time; and receiving a first reference signal after the first time;

wherein the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

12. The method according to claim 11, characterized in that when the target channel is an uplink physical layer channel and the first reference signal does not belong to the first reference signal set, the first reference signal and the target reference signal are spatially unrelated.

13. The method according to claim 11, characterized in that when the target channel is a downlink physical layer channel, the first reference signal and the target reference signal are spatially unrelated;

or, when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

14. The method according to claim 11, characterized in that transmitting a third reference signal set;

wherein the target channel is an uplink physical layer channel, and at least one reference signal in the third reference signal set is used to determine a precoder of a signal transmitted on the target channel; the third reference signal set is associated with the first reference signal set.

15. The method according to claim 11, characterized in that before the first time, the spatial relation of the transmission on the target channel is unrelated to the target reference signal;

or, comprising: transmitting a first signal; where the first signaling is used to indicate time-frequency resources occupied by the first signal; the transmission of the first signal is used to indicate that after the first time, the target reference signal is used to determine the spatial relation of the transmission on the target channel.

16. A method in a second node for wireless communications, comprising:

transmitting a first signaling, the first signaling being used to determine a first time; and transmitting a first reference signal after the first time;

wherein the first signaling is used to indicate a target reference signal; after the first time, the target reference signal is used to determine a spatial relation of a transmission on a target channel, and the first signaling is used to indicate whether the target channel is an uplink physical layer channel or a downlink physical layer channel; whether the target channel is an uplink physical layer channel or a downlink physical layer channel is used to determine whether the first reference signal and the target reference signal are spatially related; when the target channel is an uplink physical layer channel and the first reference signal belongs to a first reference signal set, the first reference signal and the target reference signal are spatially related.

17. The method according to claim 16, characterized in that when the target channel is an uplink physical layer channel and the first reference signal does not belong to the first reference signal set, the first reference signal and the target reference signal are spatially unrelated.

18. The method according to claim 16, characterized in that when the target channel is a downlink physical layer channel, the first reference signal and the target reference signal are spatially unrelated;

or, when the target channel is a downlink physical layer channel and the first reference signal belongs to a second reference signal set, the first reference signal and the target reference signal are spatially related; when the target channel is a downlink physical layer channel and the first reference signal does not belong to the second reference signal set, the first reference signal and the target reference signal are spatially unrelated; at least one reference signal in the second reference signal set does not belong to the first reference signal set.

19. The method according to claim 16, characterized in that receiving a third reference signal set;

wherein the target channel is an uplink physical layer channel, and at least one reference signal in the third reference signal set is used to determine a precoder of a signal transmitted on the target channel; the third reference signal set is associated with the first reference signal set.

20. The method according to claim 16, characterized in that before the first time, the spatial relation of the transmission on the target channel is unrelated to the target reference signal;

or, receiving a first signal; where the first signaling is used to indicate time-frequency resources occupied by the first signal; the transmission of the first signal is used to indicate that after the first time, the target reference signal is used to determine the spatial relation of the transmission on the target channel.

\* \* \* \* \*